United States Patent [19]
Fujimoto et al.

[11] Patent Number: 5,754,312
[45] Date of Patent: May 19, 1998

[54] METHOD OF AND APPARATUS FOR DETECTING PIXELS CONSTITUTING DOTTED IMAGE AREA UTILIZING DISTANCE BETWEEN CHANGE POINTS OF PIXEL VALUES

[75] Inventors: Masaya Fujimoto; Haruo Yamamoto; Masayuki Mizuno; Hidechika Kumamoto; Shinji Hayashi, all of Osaka, Japan

[73] Assignee: Mita Industrial Co., Ltd., Osaka, Japan

[21] Appl. No.: 558,187

[22] Filed: Nov. 15, 1995

[30] Foreign Application Priority Data

Nov. 22, 1994 [JP] Japan .................................. 6-288443
Nov. 22, 1994 [JP] Japan .................................. 6-288444

[51] Int. Cl.$^6$ .................................................. H04N 1/40
[52] U.S. Cl. .......................... 358/462; 358/448; 358/467; 382/224
[58] Field of Search .................. 358/462, 464, 358/465, 466, 467, 448, 450, 453, 459; 382/224, 221, 194, 195, 227, 228

[56] References Cited

U.S. PATENT DOCUMENTS

| | | | |
|---|---|---|---|
| 4,194,221 | 3/1980 | Stoffel | 358/283 |
| 4,741,046 | 4/1988 | Matsunawa et al. | 382/9 |
| 5,125,045 | 6/1992 | Murakami et al. | 382/50 |
| 5,341,227 | 8/1994 | Kumashiro | 358/533 |
| 5,384,647 | 1/1995 | Fukushima | 358/456 |
| 5,408,339 | 4/1995 | Sasaki et al. | 358/462 |
| 5,459,587 | 10/1995 | Fukushima | 358/462 |
| 5,642,201 | 6/1997 | Hayashi et al. | 358/400 |

FOREIGN PATENT DOCUMENTS 236594  9/1987  European Pat. Off. .

OTHER PUBLICATIONS

Patent Abstracts of Japan, vol. 17, No. 174, 5 Apr. 1993, 04-330869, 18 Nov. 1992.
European Search Report No. 95118318 completed Nov. 29, 1996.

*Primary Examiner*—Edward L. Coles, Sr.
*Assistant Examiner*—Madeleine Au Nguyen
*Attorney, Agent, or Firm*—Beveridge, DeGrandi, Weilacher & Young, LLP

[57] ABSTRACT

Disclosed is an apparatus for detecting pixels in a dotted image area (dotted area pixels). Image data corresponding to each of the pixels is coded into one of a predetermined number of discrete values. The distance between change points at which the value of the pixel after the coding is changed from a first value to a second value is detected. Further, it is examined whether or not periodicity is recognized in the distance between the change points in the vicinity of a target pixel. If periodicity is recognized in the distance between the change points, it is judged that the target pixel may constitute a dotted image area.

11 Claims, 22 Drawing Sheets

F I G. 5

| 1 | X | 1 | ÷ (X+2)

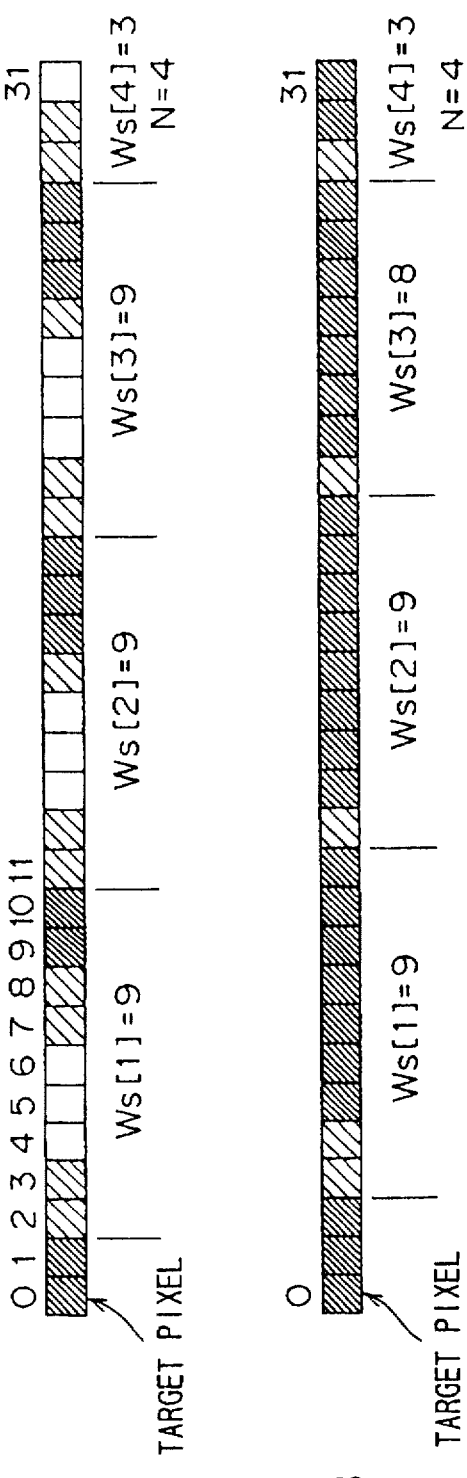

F I G. 14
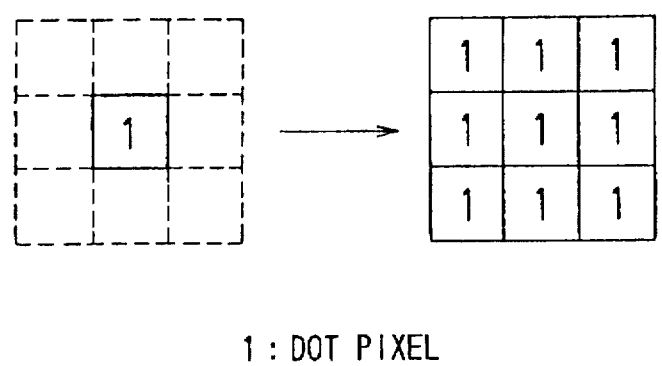
1 : DOT PIXEL

FIG. 18

| −X | 2X+1 | −X |
|---|---|---|

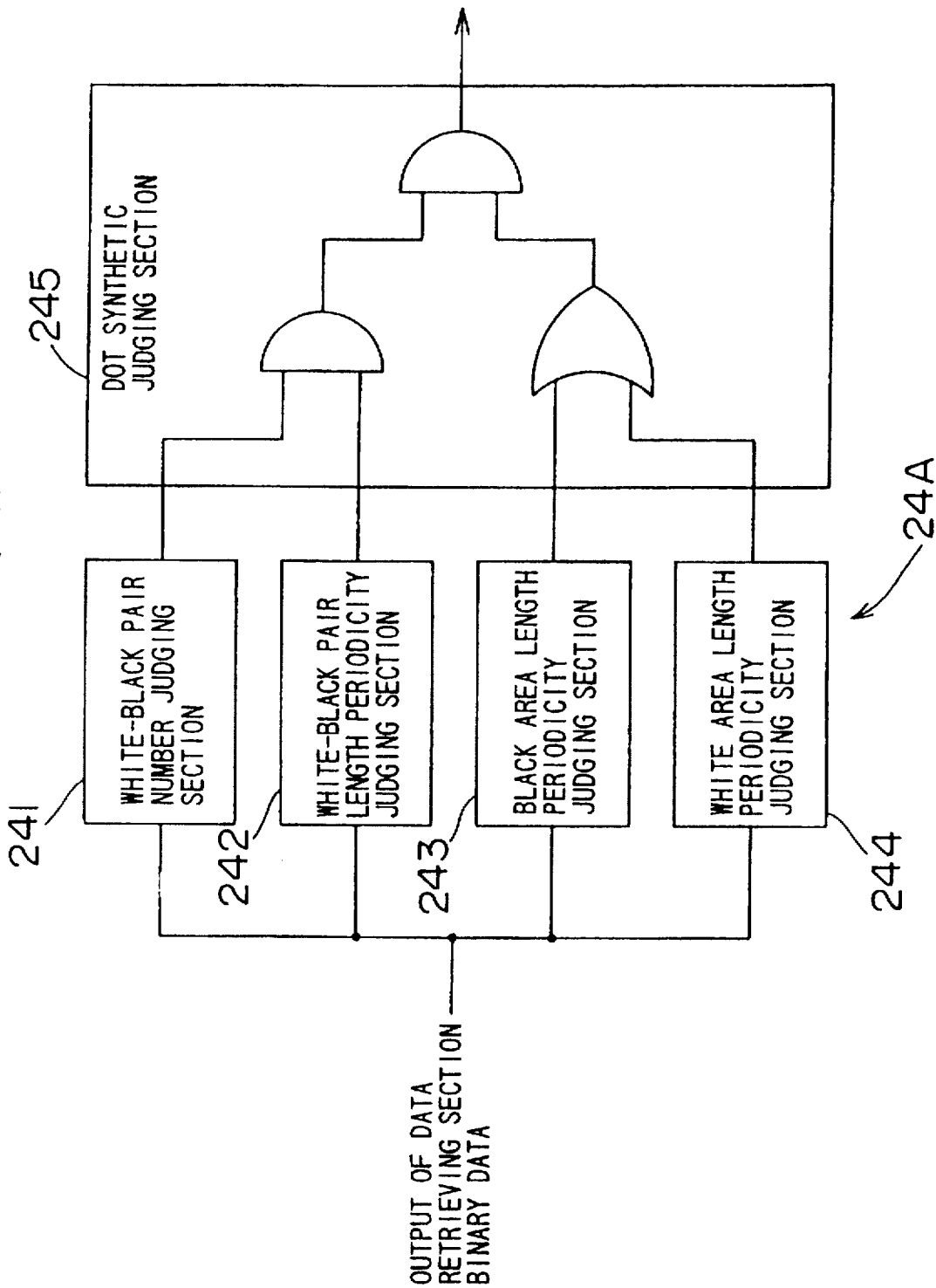

METHOD OF AND APPARATUS FOR DETECTING PIXELS CONSTITUTING DOTTED IMAGE AREA UTILIZING DISTANCE BETWEEN CHANGE POINTS OF PIXEL VALUES

BACKGROUND OF THE INVENTION

1. Field of the Invention

The present invention relates to an apparatus for and a method of detecting pixels constituting a dotted image area in an image.

2. Description of the Related Art

A digital copying machine comprises a scanner including a photoelectric device such as a CCD (Charge Coupled Device). The scanner reads an original image one line including a plurality of pixels at a time and outputs image data representing the density of each of the pixels. The original image is reproduced on the basis of the image data.

A character or line drawing image, a picture image and a dotted image may, in some cases, be present as a mixture in an original image. A dotted image is an image represented by dots periodically formed. The size of each of the dots varies from a larger value to a smaller value, thereby representing a gray scale image. In order that copies high in quality can be also acquired for the original image in which the plurality of types of images are present as a mixture, it is judged which of a character or line drawing area, a picture area and a dotted image area includes each of portions of the original image. Suitable image processing is performed for each area. Specifically, image processing corresponding to a character or line drawing area includes edge emphasis or emphasis of a black character. In addition, image processing corresponding to a dotted image area includes smoothing for removing moiré.

The area judgment is made for each judging area of predetermined size. It is judged in the following manner, for example, whether or not the judging area belongs to a dotted image area.

The image data outputted from the scanner is stored in a memory having a storage capacity corresponding to a plurality of lines. Image data corresponding to a plurality of lines are stored in the memory. The density of each of pixels is compared with a predetermined threshold value in a judging area in a predetermined range (for example, nine pixels by nine lines) centered with respect to a target pixel on the basis of the image data. If the density of the pixel is more than the threshold value, the pixel is detected as a white pixel. On the other hand, if the density of the pixel is less than the threshold value, the pixel is detected as a black pixel. Black pixels and white pixels in the judging area are thus detected.

The pattern of occurrence of the black pixels or the white pixels in the judging area or the black pixel density or the white pixel density in the judging area is then examined. It is judged whether or not the judging area belongs to a dotted image area on the basis of matching between the pattern of occurrence and a plurality of predetermined patterns representing dotted image areas or on the basis of the result of comparison between the black or white pixel density and a predetermined reference value. Specifically, if the pattern of occurrence coincides with any one of the plurality of predetermined patterns or the density is not less than the reference value, it is judged that the judging area belongs to a dotted image area.

In the above described dotted image area judging technique, a memory having a capacity corresponding to a plurality of lines is indispensable to detection of the black pixels and the white pixels. Therefore, the scale of the memory is increased.

Furthermore, there are various types of dotted images. The number of rows of dots per inch (hereinafter referred to as "the ruling") is not constant. Specifically, the ruling of a fine dotted image is approximately 200. On the other hand, the ruling of a coarse dotted image is approximately 50. In an original having a small ruling less than approximately 100, the size of each of the dots constituting the dotted image area is large, whereby the judging area must be increased. Therefore, the scale of a circuit for dotted image area judging processing must be increased.

Additionally, in the above described method, it is judged whether the black or white pixel density is relatively higher or lower than the threshold value. Since the threshold value is fixed at one value, if the entire image is at a low density, the black pixel is erroneously detected as the white pixel so that a dotted image area is erroneously judged to be a picture area. In addition, a character area may be erroneously judged to be a dotted image area. On the other hand, if the entire image is at a high density, the white pixel is erroneously detected as the black pixel so that a picture area is erroneously judged to be a dotted image area. In addition, a dotted image area may be erroneously judged to be a character area.

Examples of another method of area judgment include a method of detecting peak pixels and dip pixels. Specifically, peak pixels and dip pixels in a judging area of nine pixels by nine lines are detected. If a certain pixel is relatively denser than pixels around the pixel, the pixel is detected as a peak pixel. On the other hand, if a certain pixel is relatively thinner than pixels around the pixel, the pixel is detected as a dip pixel.

In the above described judging area, the pattern of occurrence of the peak pixels or the dip pixels or the peak pixel density or the dip pixel density is then examined. It is judged whether or not the judging area belongs to a dotted image area on the basis of matching between the pattern of occurrence and a plurality of predetermined patterns representing dotted image areas or the result of comparison between the peak or dip pixel density and a predetermined reference value. Specifically, if the pattern of occurrence coincides with any one of the plurality of predetermined patterns or the density is not less than the reference value, it is judged that the judging area belongs to a dotted image area.

Even in such a dotted image area judging technique, a memory having a capacity corresponding to a plurality of lines is indispensable, as in the case of the above described technique. Therefore, it is impossible to avoid the problem that the scale of the memory is increased.

Furthermore, in an original having a small ruling less than approximately 100, each of dots constituting a dotted image area may stick out each of pixels detected by the scanner. In such a case, in detecting the peak pixels or the dip pixels, the densities of pixels in a relatively wide area must be referred to. Therefore, the circuit scale is increased. Further, in the above described technique for detecting the peak pixels or the dip pixels, the peak pixels or the dip pixels cannot be accurately detected, whereby the pixels are erroneously detected in many cases.

SUMMARY OF THE INVENTION

A first object of the present invention is to realize a dotted image area pixel detecting apparatus capable of accurately detecting pixels constituting a dotted image area irrespective of the size of dots constituting the dotted image area.

A second object of the present invention is to provide an apparatus capable of accurately detecting pixels constituting a dotted image area using small-capacity storing means.

A third object of the present invention is to realize a method in which pixels constituting a dotted image area can be accurately detected irrespective of the size of dots constituting the dotted image area.

A fourth object of the present invention is to provide a method in which pixels constituting a dotted image area can be accurately detected using small-capacity storing means.

According to the present invention, pixels constituting a dotted image area (referred to as "dotted area pixels") in an image are detected on the basis of image data representing the densities of pixels constituting the image. The image data corresponding to each of the pixels is coded into one of a predetermined number of discrete values. The distance between change points at which the value of the pixel after the coding is changed from a first value to a second value is detected. Further, it is judged whether or not a target pixel may constitute a dotted image area based on whether or not periodicity is recognized in the distance between the change points in the vicinity of the target pixel.

The image data may be ternary-coded into a white pixel, a gray pixel or a black pixel, for example. In this case, a point at which a black pixel is changed into a gray pixel and a point at which a white pixel is changed into a gray pixel, for example, are change points. Consequently, the distance between the points at which a black pixel is changed into a gray pixel or the distance between the points at which a white pixel is changed into a gray pixel is detected.

Furthermore, the image data may be binary-coded into a white pixel or a black pixel. In this case, a point at which a black pixel is changed into a white pixel and a point at which a white pixel is changed into a black pixel are change points. Consequently, the distance between the points at which a black pixel is changed into a white pixel or the distance between the points at which a white pixel is changed into a black pixels is detected.

If the distance between the change points is approximately constant, it can be said that there is periodicity in the distance between the change points.

In a dotted image area, dots are arranged in an approximately constant period. Therefore, there should be periodicity in the distance between the change points. If periodicity in the distance between the change points is paid attention to, therefore, it can be judged whether or not the target pixel may be a dotted area pixel. Moreover, in the present invention, the image data is previously coded into one of a predetermined number of discrete values, whereby the judgment as to the periodicity can be reliably made.

Furthermore, the judgment is made on the basis of periodicity in the distance between the change points, whereby a dotted area pixel can be detected as reliably distinguished from pixels constituting a character or line drawing area without depending on the size of the dots.

On the other hand, it is preferable that the continuous length of each series of same-value pixels is detected on the basis of the value after the coding, and that it is further judged whether or not the target pixel may constitute a dotted image area based on whether or not periodicity is recognized in the continuous length of the series of same-value pixels.

Specifically, if white pixels are continuous, the number of continuous white pixels corresponds to the continuous length. Similarly, if gray pixels are continuous and when black pixels are continuous, the number of gray pixels and the number of black pixels respectively correspond to the continuous lengths.

Periodicity in the continuous length of each series of same-value pixels means that the continuous lengths of the white pixels take approximately the same value or the continuous lengths of the black pixels take approximately the same value, where the white pixels, the gray pixels and the black pixels alternately appear.

For example, where fine lines of characters periodically appear in an image, periodicity may, in some cases, be recognized in the distance between the change points. In a character area, however, it is considered that there is no periodicity in the continuous length of each series of same-value pixels. Therefore, it is possible to detect dotted area pixels more accurately by paying attention to periodicity in the continuous length of each series of same-value pixels.

The image may be constituted by a plurality of lines each including a plurality of pixels. In this case, storing means for storing image data corresponding to one or more lines may be prepared, to code the image data representing the pixels stored in the storing means. In this case, periodicity in the distance between change points and periodicity in the continuous length of each series of same-value pixels in one line, for example, are examined. Consequently, it is possible to detect dotted area pixels using small-capacity storing means. Specifically, only the image data corresponding to one line may be required. Accordingly, the scale of a processing circuit and the scale of a memory can be reduced, as compared with the prior art in which a memory capable of holding image data corresponding to at least a plurality of lines is indispensable to judgment whether or not the target pixel is the dotted area pixel.

Furthermore, where the image is constituted by the plurality of lines each including the plurality of pixels, the number of pairs of change points at which a value of the pixel is changed from a first value to a second value may be counted in a row of pixels to be detected including a predetermined number of pixels on the line to which the target pixel belongs, to judge whether or not the target pixel may constitute a dotted image area based on whether or not the counted number of pairs of change points is within a predetermined range.

This is for checking whether or not the number of pairs of change points does not exceed a range assumed from the ruling of a dotted image generally used. This further makes it possible to detect dotted area pixels more accurately.

Furthermore, the density of dotted area pixels in the vicinity of the target pixel which is judged to be a dotted area pixel may be detected. If the detected density of dotted area pixels are less than a predetermined value, it may be judged that the target pixel is not a dotted area pixel.

This processing is based on the fact that the dotted image area does not exist not singly but continuous over a certain length. That is, unless pixels which are judged to constitute a dotted image area exist at a predetermined density, the judgment is considered to be erroneous judgment due to noise or the like. Therefore, erroneous detection can be prevented by judging that the target pixel is not a dotted area pixel when the density of dotted area pixels are less than a predetermined value.

Furthermore, it is preferable that a pixel around a pixel which is judged to be a dotted area pixel is regarded as a dotted area pixel.

A dotted image area exists not linearly but in a two-dimensional manner. Therefore, the pixel adjacent to the pixel which has been judged to constitute a dotted image area is also regarded as a part of the dotted image area, thereby making it possible to detect dotted area pixels more reliably.

Where the image data is ternary-coded, it is preferable that the image data is smoothed to remove noise prior to the ternary-coding. Consequently, accurate ternary-coding is possible.

Furthermore, where the image data is binary-coded, it is preferable that the image data is smoothed to remove noise and is further subjected to edge emphasizing processing to remove a blur prior to the binary-coding. Consequently, accurate binary-coding is possible.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing an example of a filter for performing smoothing processing of image data in the preprocessing section;

FIGS. 7A and 7B are diagrams showing a row of pixels to be detected for detecting the length of a white-black-gray set in a case where a target pixel (the leftmost pixel) is a black pixel;

FIG. 14 is a diagram for explaining a method of expanding a dotted image area;

FIG. 18 is a diagram showing a filter for edge emphasizing processing;

FIG. 22 is a block diagram showing the construction of a dotted image judging section.

DESCRIPTION OF THE PREFERRED EMBODIMENTS

1. First Embodiment

Figure 1:
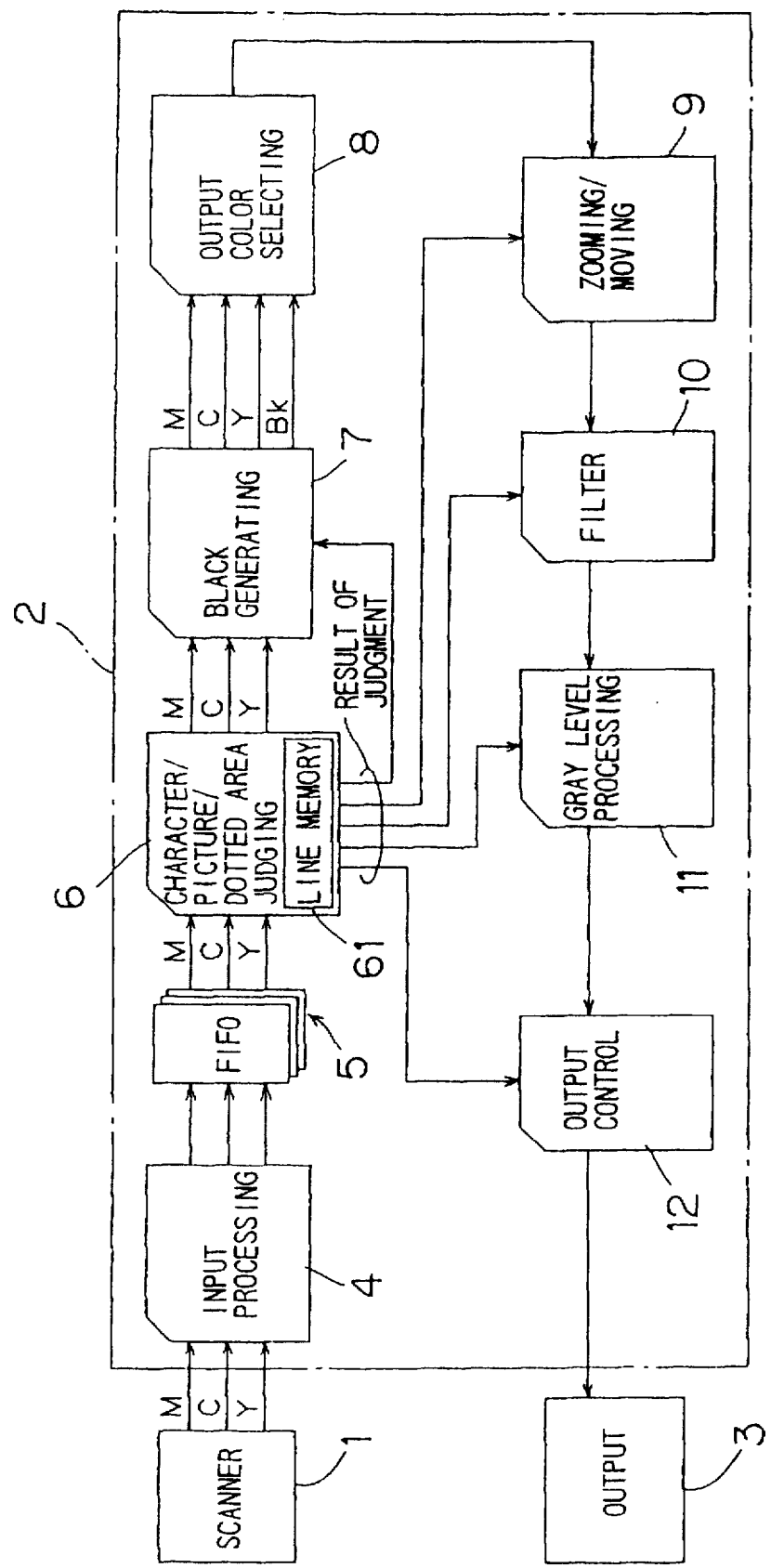
FIG. 1 is a block diagram showing the electrical construction of a principal part of a color digital copying machine to which a dotted image area judging apparatus according to one embodiment of the present invention is applied.

FIG. 1 is a block diagram showing the electrical construction of a principal part of a digital color copying machine to which a dotted image area judging apparatus according to a first embodiment of the present invention is applied.

The digital color copying machine includes a scanner 1 for optically reading a color original image to be copied. The scanner 1 photoelectrically converts the original image one line including a plurality of pixels at a time, to produce image data representing the three primary colors (additive), i.e., red (R), green (G) and blue (B) for each pixel. The scanner 1 further converts the image data of R, G and B into image data representing the three primary colors (subtractive), i.e., yellow (Y), magenta (M) and cyan (C) which are their respective complementary colors and outputs the image data of Y, M and C. The resolution of the scanner 1 may be approximately 400 pixels per inch, for example.

The image data of Y, M and C which are produced by the scanner 1 respectively correspond to the densities of the pixels. The image data in each of the colors is composed of $\beta$ bits and represents a density at $2^\beta$ gray levels. For example, if $\beta=8$, the density of each of the pixels is represented at 256 gray levels.

The digital color copying machine further includes an image processing circuit 2 for subjecting the image data of Y, M and C outputted from the scanner 1 to various processing, and an output section 3 for reproducing the original image on a paper sheet. The output section 3 may be an electrophotographic type image forming section including a photoreceptor, an exposing light source such as a laser beam scanner for selectively exposing the surface of the photoreceptor to form an electrostatic latent image, and a developing device for developing the electrostatic latent image into a toner image.

The image processing circuit 2 includes an input processing circuit 4. The image data of Y, M and C which are produced by the scanner 1 are fed to the input processing circuit 4. The input processing circuit 4 performs processing such as clock conversion for making up the difference in clocks between the scanner 1 and the image processing circuit 2. The image data of Y, M and C which are outputted from the input processing circuit 4 are fed to an FIFO (First-In First-Out) memory 5.

The image data corresponding to one arbitrary line out of the image data of Y, M and C which are fed to the FIFO memory 5 are stored in a line memory 61 provided in a character/picture/dotted area judging circuit 6.

The character/picture/dotted area judging circuit 6 judges which of a character or line drawing area, a picture area and a dotted image area includes an image represented by the image data stored in the line memory 61 on the basis of the image data. The dotted image area is an area where a halftone image, for example, is formed by dots periodically formed. The size of each of the dots is set to various values, thereby representing a gray scale image. The result of the judgment is given to a black generating circuit 7, a zooming/moving circuit 9, a filter circuit 10, a gray level processing circuit 11 and an output control circuit 12.

The image data stored in the FIFO memory 5 are also given to the black generating circuit 7 through the character/picture/dotted area judging circuit 6. The black generating circuit 7 generates black (BK) data for compensating for insufficient density in a high density portion. Specifically, a value obtained by multiplying the minimum value of the image data of Y, M and C by a correction factor γ (for example, γ=0.5 to 1), for example, is subtracted from the image data of those colors, and the subtracted value is taken as BK data. The image data of Y, M and C and the BK data are fed to a color selecting circuit 8.

The color selecting circuit 8 selects the image data corresponding to any one of the colors of the image data of Y, M, C and BK. The selected image data are fed to the zooming/moving circuit 9, where the image data are subjected to processing such as enlargement or reduction depending on the set magnification. The image data processed by the zooming/moving circuit 9 are fed to the filter circuit 10. The filter circuit 10 subjects the image data to smoothing processing, edge emphasizing processing or the like depending on the result of the judgment given from the character/picture/dotted area judging circuit 6. The image data processed by the filter circuit 10 are fed to the gray level processing circuit 11. The gray level processing circuit 11 subjects the image data to halftone processing such as so-called dither processing or multivalued dither processing.

The image data which are subjected to the halftone processing are subjected to required processing by the output control circuit 12, after which the image data are fed to the output section 3.

Figure 2:
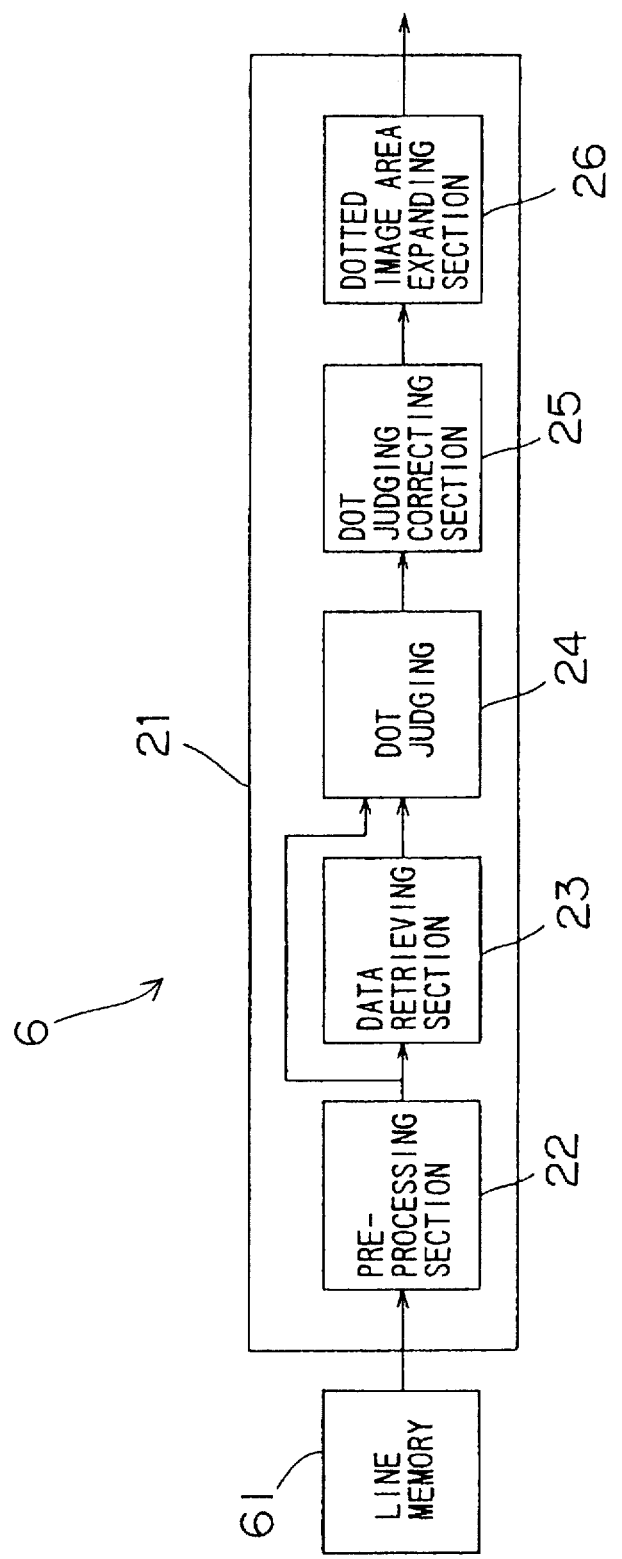
FIG. 2 is a block diagram for explaining the flow of dotted image area judging processing.

FIG. 2 is a block diagram for explaining the flow of dotted image area judging processing in the above described character/picture/dotted area judging circuit 6. The character/picture/dotted area judging circuit 6 includes a dotted image area judging section 21 for extracting image data representing a dotted image area. The dotted image area judging section 21 includes a preprocessing section 22, a data retrieving section 23, a dot judging section 24, a dot judgment correcting section 25 and a dotted image area expanding section 26.

Figure 3:
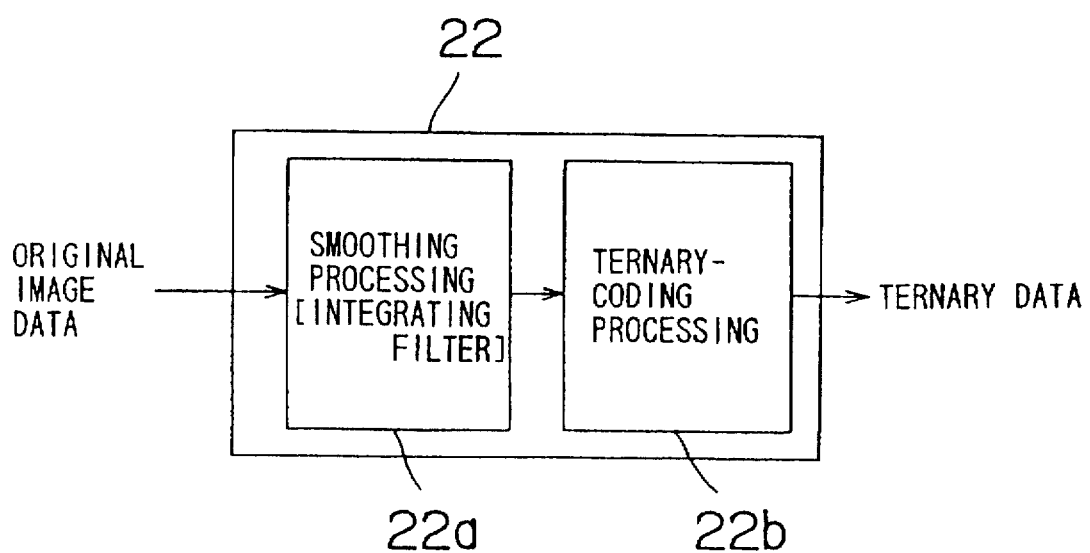
FIG. 3 is a block diagram for explaining the flow of processing in a preprocessing section.

The preprocessing section 22 subjects image data corresponding to one line outputted from the line memory 61 to smoothing processing 22a and ternary-coding processing 22b, as shown in FIG. 3. The line memory 61 holds image data corresponding to one arbitrary line in an arbitrary color out of Y, M and C.

The data retrieving section 23 detects the length of a white-black-gray set (23a), detects the length of a white area (23b), and detects the length of a black area (23c) on the basis of data corresponding to a target pixel and pixels ahead of and behind the target pixel which have passed through the preprocessing section 22. The results of the detection are fed to the dot judging section 24, where synthetic judgment whether or not the target pixel is a pixel in a dotted image area (dotted area pixel) is made.

The result of the synthetic judgment is corrected in the dot judgment correcting section 25, and the corrected result is subjected to area expansion in the dotted image area expanding section 26.

Description is now made of the details of the functions of the respective sections.

1-1. Preprocessing section 22

Referring to FIG. 3, the preprocessing section 22 subjects image data corresponding to one line to smoothing processing and ternary processing.

Figure 5:
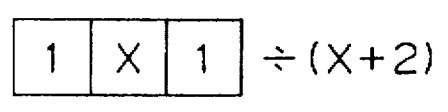

The smoothing processing is for removing noise. A smoothing filter of one line by three dots shown in FIG. 5 is used. Specifically, a value obtained by increasing the density of each of pixels adjacent to the target pixel on both sides by one time is added to a value obtained by increasing the density of the target pixel by X times, and the result of the addition is divided by (X+2), whereby the new density of the target pixel is calculated. Although the value of X is set to three, for example, it may be set to four or five.

The ternary processing is processing for classifying the target pixel as any one of a white pixel, a black pixel and a gray pixel. Therefore, two threshold values, a large threshold value and a small threshold value are set. The ternary processing section 22b outputs a signal of "2" if the density of the target pixel is not less than the large threshold value, outputs a signal of "1" if the density is not less than the small threshold value and less than the large threshold value, and outputs a signal of "0" if the density is less than the small threshold value. A pixel corresponding to the signal of "2" is referred to as a "black pixel", a pixel corresponding to the signal of "1" is referred to as a "gray pixel", and a pixel corresponding to the signal of "0" is referred to as a "white pixel". If the density of the pixel is represented at 256 gray levels, values of 160 and 50, for example, may be respectively employed as the large threshold value and the small threshold value.

Edge emphasizing processing for preventing a blur of dots is not performed. Without emphasizing an edge portion of an image, ternary-coding into a white pixel, a black pixel or a gray pixel can be satisfactorily performed.

1-2. Data retrieving section 23

Figure 4:
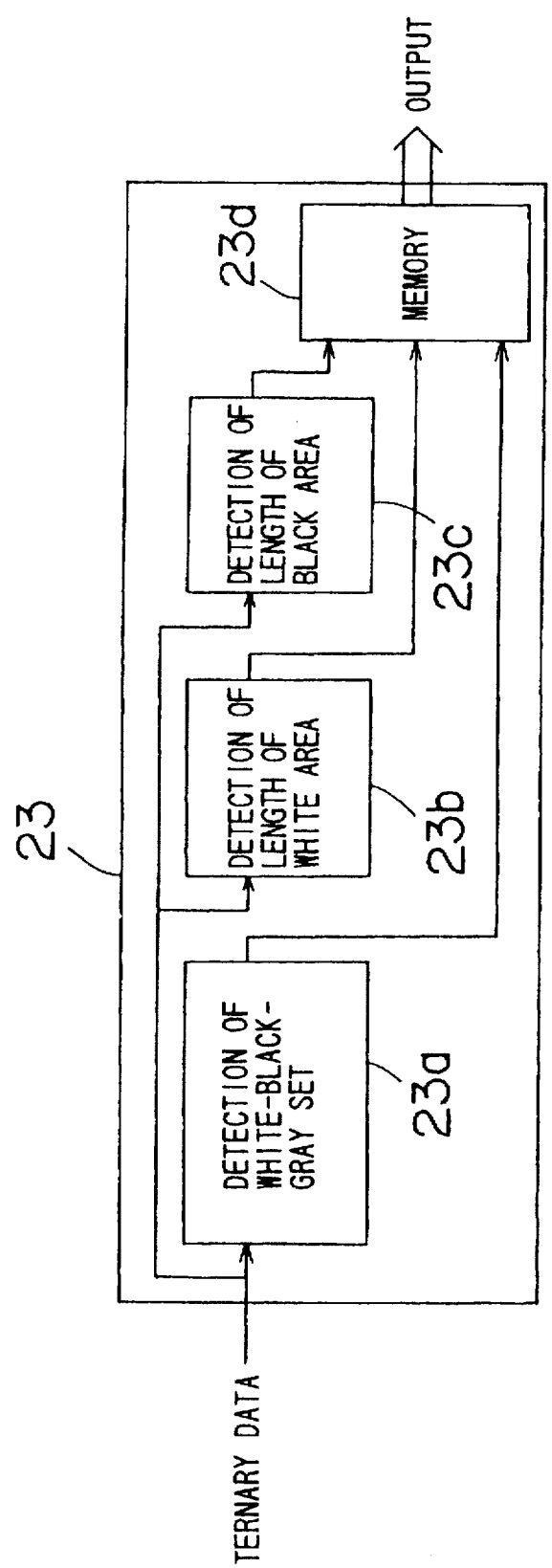
FIG. 4 is a block diagram for explaining the flow of processing in a data retrieving section.

Referring to FIG. 4, the data retrieving section 23 detects the length of a white-black-gray set (23a), detects the length of a white area (23b), and detects the length of a black area (23c) on the basis of image data corresponding to a target pixel and pixels around the target pixel which have passed through the preprocessing section 22.

1-2-1. Detection of white-black-gray set (23a)

A white-black-gray set is detected with respect to ternary data after ternary processing.

Figure 6:
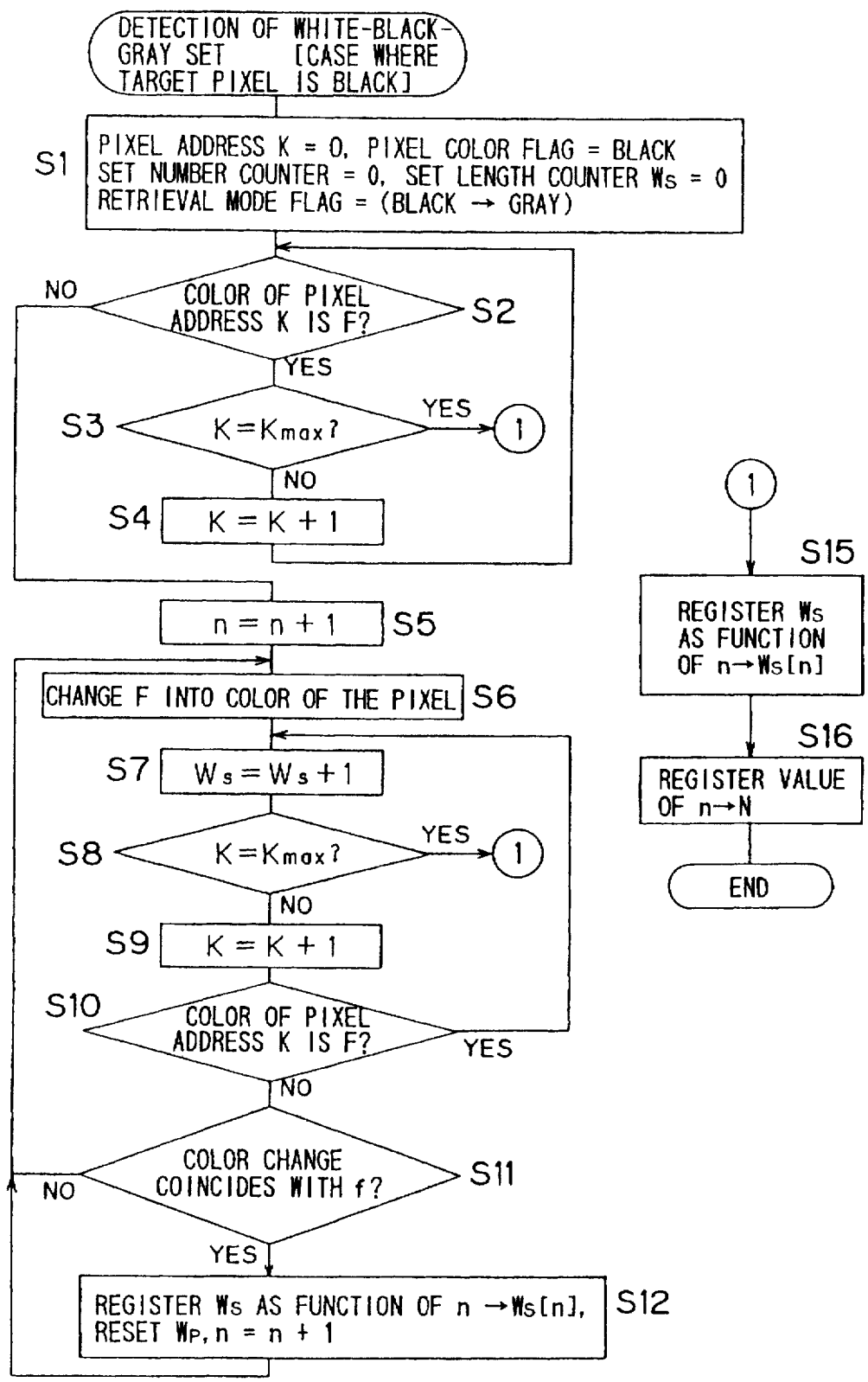
FIG. 6 is a flow chart showing the flow of detection of a white-black-gray set in the data retrieving section.

FIG. 6 is a flow chart showing detection of a white-black-gray set, and FIGS. 7A, 7B, 8A and 8B illustrate a row of pixels to be detected. The row of pixels to be detected is constituted by 32 pixels assigned addresses 0 to 31, starting with the target pixel (the leftmost pixel).

Figure 8A:
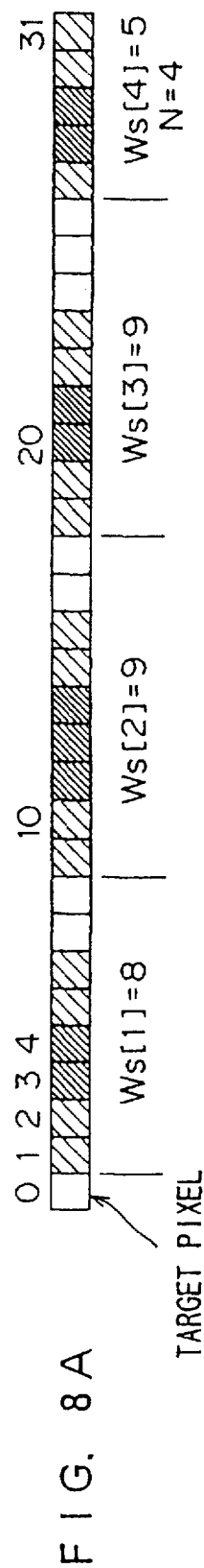
FIGS. 8A and 8B are diagrams showing a row of pixels to be detected for detecting the length of a white-black-gray set in a case where a target pixel is a white pixel.
Figure 8B:
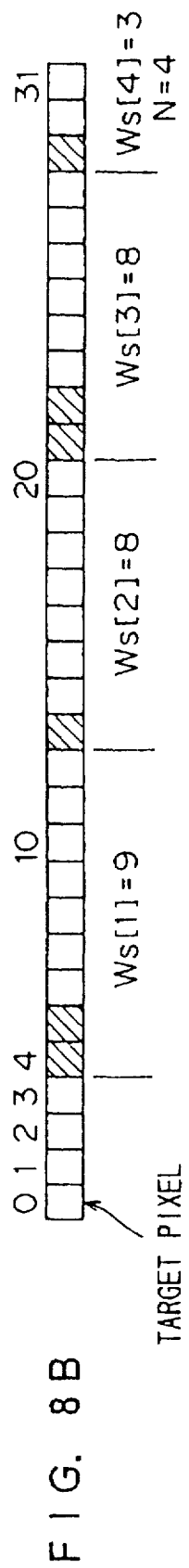

FIGS. 7A and 7B illustrate a case where the target pixel is a black pixel, and FIGS. 8A and 8B illustrate a case where the target pixel is a white pixel. No detection is performed in a case where the target pixel is gray. In the drawings, the black pixel shall be indicated by dense oblique hatching, and the gray pixel shall be indicated by coarse oblique hatching. A pixel with no oblique hatching is a white pixel.

Referring to FIGS. 6, 7A and 7B, description is now made of a case where the target pixel is a black pixel. A pixel color flag F representing the color of a pixel is first set to a black color which is the color of the target pixel. In addition, a white-black-gray set number counter (hereinafter referred to as a "set number counter") n representing the number of times of detection of a set of white, black and gray pixels is reset to zero. A pixel address K representing the position of a pixel is set to zero. Further, a white-black-gray set length counter (hereinafter referred to as a "set length counter") $W_S$ representing the length of the set of white, black and gray pixels is initialized to zero, and a retrieval mode flag f is set to "from black to gray" (step S1). The retrieval mode flag f represents a change of the values of pixels to be detected.

The pixel color flag F is set to any one of "white", "black" and "gray", and the retrieval mode flag f is set to either "from black to gray" or "from white to gray".

The white-black-gray set detecting section 23a then judges whether or not the color of a pixel assigned the address K conforms to a color represented by the pixel color flag F (step S2). Initially, it is judged whether or not the color of a pixel assigned an address 0 is black.

If the color of the pixel assigned the address K conforms to the color represented by the pixel color flag F, it is judged whether or not the address K takes the final value Kmax (step S3). The final value Kmax corresponds to the number of pixels in a one-dimensional area ahead of the target pixel, where Kmax=31, for example.

As a result, if K<Kmax, one is added to the address K (step S4), after which the program is returned to the step S2.

When the color of the pixel does not conform to the color represented by the pixel color flag F in the step S2, that is, a pixel in a different color is encountered, the set number counter n is incremented by one (step S5), the color represented by the pixel color flag F is changed into the color of the pixel (step S6), and the set length counter $W_S$ is incremented by one (step S7).

In an example shown in FIG. 7A, at the time when a pixel assigned an address 2 is processed, the set number counter n is updated to one, the color represented by the pixel color flag F is changed into a gray color, and the set length counter $W_S$ is updated to one.

Thereafter, it is judged whether or not the address K takes the final value Kmax (step S8), one is added to the address K unless the address K takes the final value Kmax (step S9), and it is judged whether or not the color of the pixel assigned the address K conforms to the color represented by the pixel color flag F (step S10). If the answer is in the affirmative, the set length counter $W_S$ is incremented by one (step S7), after which the same processing is repeated.

In the example shown in FIG. 7A, the set length counter $W_S$ is repeatedly incremented by one so long as gray pixels are continuous.

If it is judged in the step S10 that the color of the pixel assigned the address K does not conform to the color represented by the pixel color flag F (the color is changed), it is examined in the step S11 whether or not the color change coincides with the content of the retrieval mode flag f.

In the example shown in FIG. 7A, at the time point of the judgment, the color change is from a gray color to a white color, whereby the color change differs from the content of the retrieval mode flag f, i.e., "from black to gray". It is judged in the step S11 that the answer is in the negative, after which the program is returned to the step S6. In the step S6, the color represented by the pixel color flag F is then changed into a white color, after which the length in which white pixels are continuous is detected.

In the example shown in FIG. 7A, after a white pixel assigned an address 4 is detected, the length in which white pixels are continuous is detected.

If the color of the pixel is changed once again, the color change is from a white color to a gray color at this time, whereby the color change differs from the content of the retrieval mode flag f, i.e., "from black to gray". It is judged in the step S11 that the answer is in the negative, after which the program is returned to the step S6. In the step S6, the color represented by the pixel color flag F is then changed into a gray color, after which the length in which gray pixels are continuous is detected.

If the color of the pixel is changed once again, the color change is from a gray color to a black color at this time, whereby the color change differs from the content of the retrieval mode flag f, i.e., "from black to gray". It is judged in the step S11 that the answer is in the negative, after which the program is returned to the step S6. In the step S6, the color represented by the pixel color flag F is changed into a black color, after which the length in which black pixels are continuous is retrieved.

If the color of the pixel is changed once again, the color change is from a black color to a gray color at this time, whereby the color change coincides with the content of the retrieval mode flag f, i.e., "from black to gray". Consequently, one white-black-gray set is completed at this time point.

In the example shown in FIG. 7A, it is considered that one white-black-gray set is completed at the time of processing a gray pixel assigned an address 11. The value of the set length counter $W_S$ at this time represents the length of the white-black-gray set, and the value of the set number counter n represents the number of white-black-gray sets so far produced. In this case, the length of the white-black-gray set corresponds to the distance between change points at which the value of the pixel is changed from "black" to "gray". In addition, the number of white-black-gray sets corresponds to the number of pairs of change points.

In the step S12, the value of the set length counter $W_S$ is registered in a memory 23d as a function $W_S[n]$ of the set number counter n, the set length counter $W_S$ is reset to zero, and the set number counter n is incremented by one, after which the program is returned to the step S6. In the step S6 and the subsequent steps, the same processing is performed.

When the address K takes the final value Kmax, counting by the set length counter $W_S$ and counting by the set number counter n are terminated, and the value of the set length counter $W_S[n]$ at the time point of the termination is registered in the memory 23d (see FIG. 4) (step S15). In addition, the value of the set number counter n is registered in the memory 23d as the number of white-black-gray sets N (step S16). The termination and the registration are performed in the same manner whatever color is the color of the final pixel.

In the example shown in FIG. 7A, the counting is terminated at the time of processing a white pixel assigned an address 31, whereby the value "3" of the set length counter $W_S[4]$ and the value "4" of the set number counter n at that time are registered in the memory 23d.

In the foregoing manner, the number of white-black-gray sets included in the row of pixels to be detected and the lengths $W_S[n]$ thereof can be registered in the memory 23d.

The above described description assumes a case where pixels are regularly continuous in the order of black→gray→white→gray→black, as shown in FIG. 7A. However, the processing shown in FIG. 6 is also applicable to detection of such a dense dotted image area that pixels are regularly continuous in the order of black→gray→black, as shown in FIG. 7B, for example.

Furthermore, the above described processing is also performed on the left side of the target pixel. In this case, the final value Kmax is replaced with −Kmax, and the processing in the steps S4 and S9, i.e., "K=K+1" is replaced with "K=K−1". In the following, a subscript "−" shall be assigned with respect to the result of processing of a row of pixels on the left side of the target pixel, and a subscript "+" shall be assigned with respect to the result of processing of a row of pixels on the right side of the target pixel.

The foregoing processing is processing in a case where the first target pixel is a black pixel. Even when the first target pixel is a white pixel, however, the length of a white-black-gray set can be detected in approximately the same manner. In this case, "pixel color flag F=black" and "retrieval mode flag f=(from black to gray)" in the step S1 shown in FIG. 6 will be respectively changed into "pixel color flag F=white" and "retrieval mode flag f=(from white to gray)", and a row of pixels to be detected will be as shown in FIGS. 8A and 8B. In this case, the length of the white-black-gray set corresponds to the distance between change points at which the value of the pixel is changed from "white" to "gray".

1-2-2. Detection of length of white area (23b)

The length of a white area is detected with respect to ternary data after ternary processing.

Figure 9:
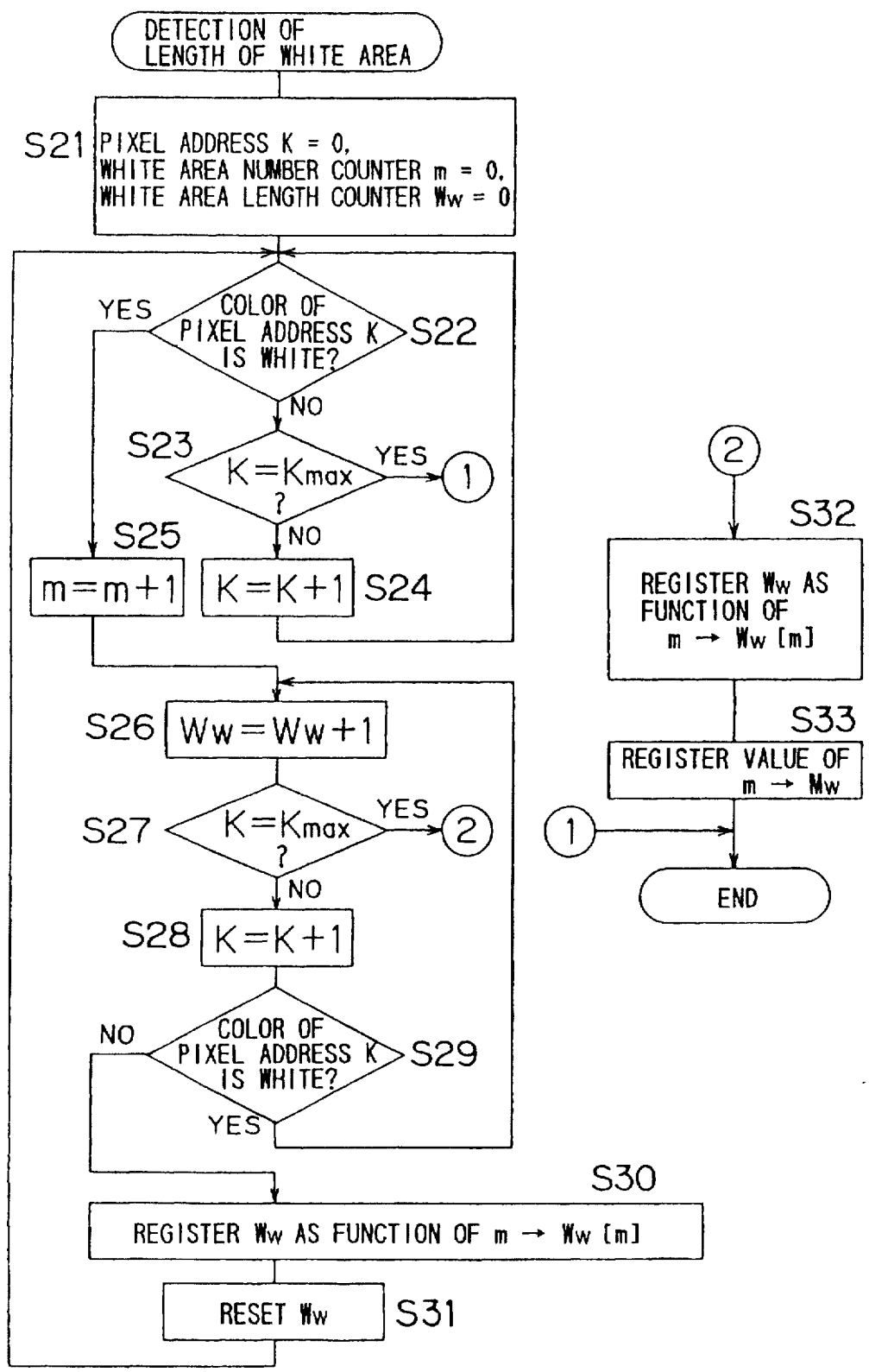
FIG. 9 is a flow chart showing the flow of detection of the length of a white area in the data retrieving section.
Figure 10:
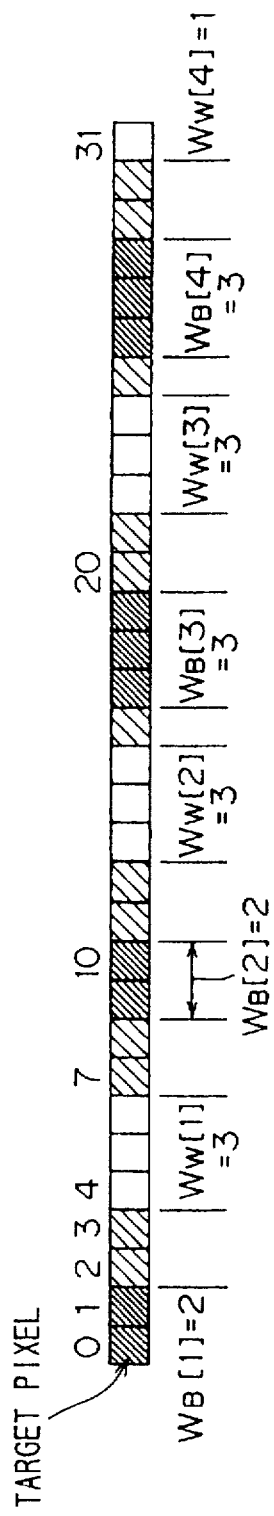
FIG. 10 is a diagram showing a row of pixels to be detected for detecting the length of a white area in a case where a target pixel is a black pixel.
Figure 11:
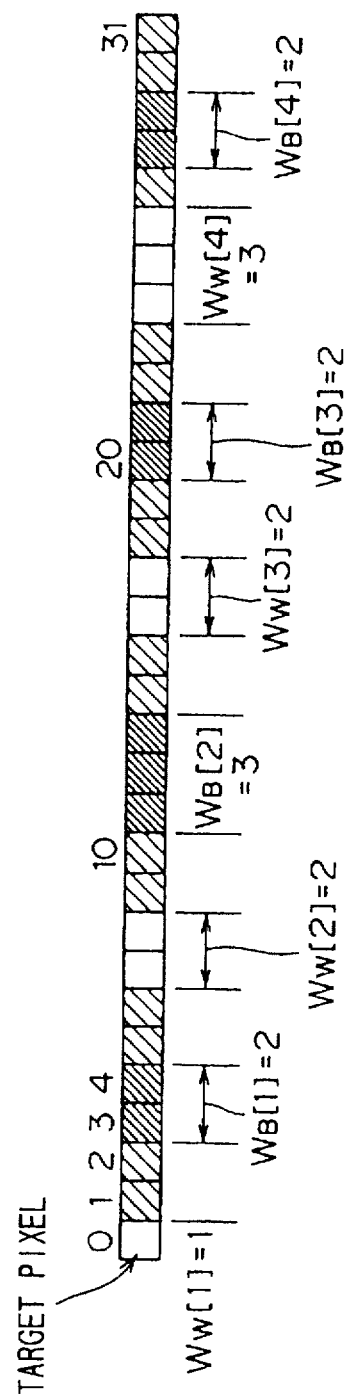
FIG. 11 is a diagram showing a row of pixels to be detected for detecting the length of a white area in a case where a target pixel is a white pixel.

FIG. 9 is a flow chart showing the detection of the length of a white area, and FIGS. 10 and 11 illustrate a row of pixels to be detected. The row of pixels to be detected is constituted by 32 pixels successively assigned addresses 0 to 31, starting with the target pixel (the leftmost pixel).

FIG. 10 illustrates a case where the target pixel is a black pixel, and FIG. 11 illustrates a case where the target pixel is a white pixel. No detection is performed in a case where the target pixel is gray.

Referring to FIGS. 9 and 10, a white area number counter m is initialized to zero, a pixel address K is set to zero, and a white area length counter $W_W$ is initialized to zero (step S21).

It is then judged whether or not the color of a pixel assigned the address K is white (step S22). It is first judged whether or not a pixel assigned an address 0 is a white pixel.

If the answer is in the negative, it is judged whether or not the address K takes the final value Kmax (step S23). As a result, if K<Kmax, one is added to the address K (step S24), after which the program is returned to the step S22.

When a white pixel is encountered in the step S22, the white area number counter m is incremented by one (step S25), and the white area length counter $W_W$ is incremented by one (step S26).

In an example shown in FIG. 10, the white area number counter m is set to one and the white area length counter $W_W$ is increased by one at the time point where the pixel to be detected becomes a pixel assigned an address 4.

Thereafter, it is judged whether or not the address K takes the final value Kmax (step S27). Unless the address K takes the final value Kmax, one is added to the address K (step S28), and it is judged whether or not the pixel assigned the address K is a white pixel (step S10). If the pixel is a white pixel, one is added to the white area length counter $W_W$ (step S26), after which the same processing is repeated. Consequently, the white area length counter $W_W$ is repeatedly incremented by one so long as white pixels are continuous. Consequently, it is possible to count the length of a white area.

If it is judged in the step S29 that the color of the pixel assigned the address K is not white (i.e., black or gray), the value of the white area length counter $W_W$ is registered in the memory 23d as a function $W_W[m]$ of the white area number counter m in the step S30 (step S30). Thereafter, the white area length counter $W_W$ is reset to zero, after which the program is returned to the step S22.

In the example shown in FIG. 10, one white area is completed at the time point where a gray pixel assigned an address 7 is processed. The value "3" of the white area length counter $W_W$ at this time represents the length of the white area, and the value "1" of the white area number counter m represents the number of white areas so far produced.

When the address K finally takes the final value Kmax, counting by the white area length counter $W_W$ and counting by the white area number counter m are terminated, and the white area length counter $W_W[m]$ at the time point of the termination is registered in the memory 23d (step S32). In addition, the value of the white area number counter m is registered in the memory 23d as the number of white areas $M_W$ (step S33). The termination and the registration are performed in a case where the pixel at the last position is white, and are not performed in a case where the pixel at the last position is black.

In the example shown in FIG. 10, the counting is terminated at the time of processing a white pixel assigned an address 31, whereby the value "1" of the white area length counter $W_W$ and the value "4" of the white area number counter m at that time are registered in the memory 23d.

In the foregoing manner, it is possible to register the number of white areas included in the row of pixels and the lengths thereof.

The above described processing is also performed on the left side of the target pixel. In this case, the final value Kmax is replaced with −Kmax, and the processing in the steps S24 and S28, i.e., "K=K+1" is replaced with "K=K−1". In the following, a subscript "−" shall be assigned with respect to the result of processing of a row of pixels on the left side of the target pixel, and a subscript "+" shall be assigned with respect to the result of a row of pixels on the right side of the target pixel.

The foregoing processing is processing in a case where the target pixel is a black pixel. Even when the target pixel is a white pixel, however, the length of a white area can be detected in approximately the same manner. In this case, a row of pixels to be detected in a case where the target pixel is a white pixel is as shown in FIG. 11, to which processing indicated by the flow chart of FIG. 9 is applicable as it is.

1-2-3. Detection of length of black area

The length of a black area is also detected with respect to ternary data after ternary-coding processing.

The length of a black area can be detected in entirely the same manner as the length of the white area described in the foregoing item 1-2-2 by only replacing a subscript W representing a white color with a subscript B representing a black color and respectively replacing "white" and "black" with "black" and "white" in the flow chart of FIG. 9.

In the following, the number of black areas and the length of the black area shall be respectively represented by $M_B$ and $W_B[m]$.

1-3. Dot judging section 24

Figure 12:
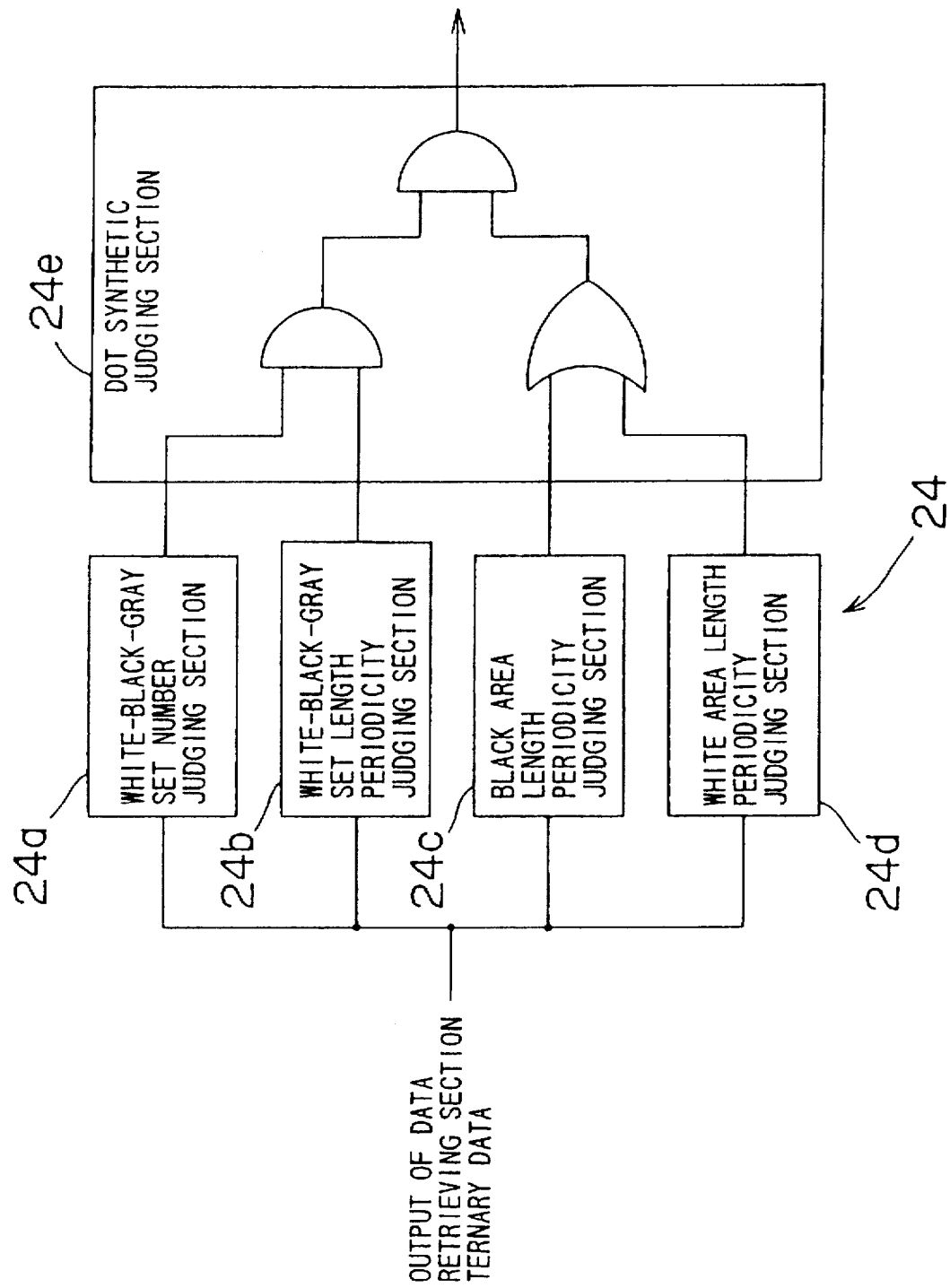
FIG. 12 is a block diagram for explaining the flow of processing in a dotted image judging section.

A dot judging section 24 is constructed as shown in FIG. 12 and judges whether or not the target pixel is included in a dotted image area on the basis of respective data representing the numbers of white-black-gray sets $N_+$ and $N_-$, the lengths of the white-black-gray set $W_{S+}[n]$ (n=1, 2, ...) and $W_{S-}[n]$, the numbers of white areas $M_{W+}$ and $M_{W-}$, the lengths of the white area $W_{W+}[m]$ (m=1, 2, ...) and $W_{W-}[m]$, the numbers of black areas $M_{B+}$ and $M_{B-}$, and the lengths of the black area $W_{B+}[m]$ and $W_{B-}[m]$ with respect to a row of 2Kmax pixels ahead of and behind the target pixel (a row of pixels assigned addresses −Kmax to +Kmax) and ternary image data which are sent from the data retrieving section 23. However, the judgment is not made in a case where the target pixel is gray.

1-3-1. White-black-gray set number judging section 24a

A white-black-gray set number judging section 24a judges whether or not the target pixel is a dot candidate on the basis of the number of white-black-gray sets N. Specifically, in a case where the number of white-black-gray sets with respect to a row of pixels to be detected ahead of the target pixel is taken as $N_+$, the target pixel is taken as a dot candidate if the following expression (1) holds, while the target pixel is not taken as a dot candidate if it does not hold:

$$\text{Lower limit threshold value of } N \leq N_+ \text{ or } N_+ \leq \text{Upper limit threshold value of } N \quad (1)$$

The lower limit threshold value of N is set to 3 and the upper limit threshold value of N is set to 16 with respect to a row of 32 pixels, for example.

The ground of the numerals are as follows. If the resolution of the scanner 1 is approximately 400 pixels per inch, 32 pixels correspond to an area of 2 mm. Five pairs of black pixels and white pixels enter the area of 2 mm if the ruling of a dotted image is 65 per inch, and 16 pairs of black pixels and white pixels enter the area of 2 mm if the ruling a dotted image is 200 per inch. If 3 is set as the lower limit threshold value of N and 16 is set as the upper limit threshold value of N, therefore, it is possible to detect, as dot candidates, dots in a dotted image having the ruling of approximately 65 to 200 lines per inch generally used.

Although the above described processing is with respect to a row of pixels ahead of the target pixel, the number of white-black-gray sets is judged similarly with respect to a row of pixels to be detected behind the target pixel.

1-3-2. White-black-gray set length periodicity judging section 24b

A white-black-gray set length periodicity judging section 24b judges whether or not there is periodicity in the length of a white-black-gray set. In a dotted image area, the white-black-gray set is generally repeated in approximately the same period.

When the target pixel is detected as a dot candidate by the white-black-gray set number judging section 24a described in the above item 1-3-1, the judgment is made on the basis of the length of the white-black-gray set $W_{S+}[n]$ with respect to a row of pixels to be detected ahead of the target pixel.

For example, the upper limit threshold value of the length of the white-black-gray set $W_S$ is set to 12, and the lower limit threshold value thereof is set to 2. If the resolution of the scanner 1 is approximately 400 pixels per inch, 12 pixels correspond to 0.03 inches, and two pixels correspond to 0.005 inches. Consequently, the upper limit threshold value corresponds to 33 lines per inch, and the lower limit threshold value corresponds to 200 lines per inch. If the length of the white-black-gray set $W_{S+}[n]$ has a value between the upper limit threshold value and the lower limit threshold value, therefore, the target pixel may be a pixel in the dotted image area.

Consequently, it is first judged whether or not the following expression (2) is satisfied with respect to the length of the first white-black-gray set $W_{S+}[1]$:

$$\text{Lower limit threshold value of } W_S \leq W_{S+}[1] \text{ or } W_{S+}[1] \leq \text{Upper limit threshold value of } W_S \quad (2)$$

If the expression is not satisfied, it is considered that the target pixel is not a dot candidate. The reason for this is that unless the length of the first white-black-gray set enters a range between the threshold values, it is apart from the ruling generally used.

When the foregoing expression is satisfied, periodicity in the length of the white-black-gray set is judged.

Therefore, the upper limit threshold value for judging periodicity is set to $W_{S+}[1]+1$ on the basis of the length of the first white-black-gray set $W_{S+}[1]$.

It is judged whether or not the following expression (3) holds with respect to the lengths of the second to $(N_+ -1)$-th white-black-gray sets $W_{S+}[n]$:

$$\text{Lower limit threshold value for judging periodicity} \leq W_{S+}[n] \leq \text{Upper limit threshold value for judging periodicity} \quad (3)$$

Judgment based on the following expression (4) is made with respect to the length of the final $N_+$-th white-black-gray set $W_{S+}[N_+]$, to judge only the relationship with the upper limit threshold value:

$$W_{S+}[N_+] \leq \text{Upper limit threshold value for judging periodicity} \quad (4)$$

The reason why only the relationship with the upper limit threshold value is judged is that the counting of the length of the final $N_+$-th white-black-gray set $W_{S+}[N_+]$ is terminated on the way.

If the foregoing expressions (3) and (4) are not satisfied with respect to all the lengths of the second to final $N_+$-th white-black-gray sets $W_{S+}$, it is considered that there is no periodicity.

Furthermore, the same judgment of periodicity in the length of the white-black-gray set is also made with respect to a row of pixels to be detected behind the target pixel.

1-3-3. Black area length periodicity judging section 24c and white area length periodicity judging section 24d.

A black area length periodicity judging section 24c judges the presence or absence of periodicity with respect to the length of a black area. On the other hand, a white area length periodicity judging section 24d judges the presence or absence of periodicity with respect to the length of a white area. If only periodicity in the length of a white-black-gray set is judged, erroneous judgment may be made with respect to an image having particular periodicity as in a case where white and black colors are periodically arranged in a part of a character. Therefore, periodicity in only the length of the white area or the length of the black area is judged, thereby making it possible to expect to detect the dotted image area more reliably.

If the target pixel is a white pixel (see FIG. 11), periodicity in the length of the white area is first judged.

The length of the white area $W_{W+}[1]$ including the target pixel and the length of the succeeding white area $W_{W+}[2]$ are read out from the memory 23d (see FIG. 4) with respect to a row of pixels to be detected ahead of the target pixel. If the following expression (5) holds, it is considered that there may be periodicity in the length of the white area, to judge periodicity in the length of the succeeding white area. Unless the following expression (5) holds, it is judged that the target pixel is not a dot candidate, whereby neither the judgment of periodicity in the length of the white area nor the judgment of periodicity in the length of the succeeding black area is made:

$$W_{W+}[1] \leq W_{W+}[2]+1 \quad (5)$$

The reason why such "preliminary judgment" is made is that there is a case where the length of the white area is abnormally long-continued from the white target pixel. In this case, it is difficult to think that the target pixel is a dotted area pixel.

If the above described preliminary judgment is cleared, periodicity in the length of the white area is judged.

The upper limit threshold value and the lower limit threshold value for judging periodicity are first set, as indicated by the following expressions (6) and (7), on the basis of the length of the second white area $W_{W+}[2]$:

Upper limit threshold value=$W_{W+}[2]+1$ (6)

Lower limit threshold value=$W_{W+}[2]-1$ (7)

It is then judged whether or not the following expression (8) holds with respect to the lengths of the third to ($M_{W+}-1$)-th white areas $W_{W+}[m]$:

Lower limit threshold value for judging periodicity $\leq W_{W+}[m]$
$\leq$ Upper limit threshold value for judging periodicity (8)

Only the relationship with the upper limit threshold value represented by the following expression (9) is judged with respect to the length of the final $M_{W+}$-th white area $W_{W+}[M_{W+}]$:

$W_{W+}[M_{W+}] \leq$ Upper limit threshold value for judging periodicity(9)

The reason why only the relationship with the upper limit threshold value is judged is that the counting of the length of the final $M_{W+}$-th white area $W_{W+}[M_{W+}]$ is terminated on the way.

If the conditions indicated by the foregoing expressions (8) or (9) are not satisfied with respect to all the lengths of the third to final $M_{W+}$-th white areas $W_{W+}$, it is judged that there is no periodicity in the length of the white area.

Furthermore, the same judgment of periodicity in the length of the white area is also made with respect to a row of pixels to be detected behind the target pixel.

Description is now made of the judgment of periodicity in the length of the black area made in a case where the target pixel is a black pixel (see FIG. 10). Also in this case, the length of the black area $W_{B+}[1]$ including the target pixel and the length of the succeeding black area $W_{B+}[2]$ are taken out with respect to a row of pixels to be detected ahead of the target pixel, as in entirely the same as the above described judgment of periodicity in the length of the white area. If the following expression (10) holds, it is considered that there is periodicity in the length of the black area, to judge periodicity in the length of the succeeding black area. Unless the following expression (5) holds, it is considered that the target pixel is not a dot candidate (preliminary judgment):

$W_{B+}[1] \leq W_{B+}[2]+1$ (10)

If the above described preliminary judgment is cleared, the presence or absence of periodicity in the length of the black area is judged.

The upper limit threshold value and the lower limit threshold value for judging periodicity are first set, as indicated by the following expressions (11) and (12), for example, on the basis of the length of the second black area $W_{B+}[2]$:

Upper limit threshold value=$W_{B+}[2]+1$ (11)

Lower limit threshold value=$W_{B+}[2]-1$ (12)

It is then judged whether or not the following expression (13) holds with respect to the lengths of the third to ($M_{B+}-1$)-th black areas $W_{B+}[m]$:

Lower limit threshold value for judging periodicity $\leq W_{B+}[m]$
$\leq$ Upper limit threshold value for judging periodicity (13)

Only the relationship with the upper limit threshold value represented by the following expression (14) is judged with respect to the length of the final $M_{B+}$-th black area $W_{B+}[M_{B+}]$:

$W_{B+}[M_{B+}] \leq$ Upper limit threshold value for judging periodicity(14)

If the conditions indicated by the foregoing expressions (13) or (14) are not satisfied with respect to all the lengths of the third to final $M_{B+}$-th black areas $W_{B+}$, it is judged that there is no periodicity in the length of the black area.

Furthermore, the same judgment of periodicity in the length of the black area is also made with respect to a row of pixels to be detected behind the target pixel.

1-3-4. Dot synthetic judging section 24e

A dot synthetic judging section 24e judges whether or not the target pixel is a pixel included in a dotted image area (dotted area pixel) on the basis of the results of the judgment of the number of white-black-gray sets (24a), the judgment of periodicity in the length of a white-black-gray set (24b), the judgment of periodicity in the length of a black area (24c), and the judgment of periodicity in the length of a white area (24d).

More specifically, in judgment based on a row of pixels to be detected either ahead of or behind the target pixel, if three conditions indicated by the following items (a), (b) and (c) are satisfied, it is judged that the target pixel is a dotted area pixel.

(a) The white-black-gray set number judging section 24a judges that the target pixel is a dot candidate.

(b) The white-black-gray set length periodicity judging section 24b judges that the target pixel is a dot candidate.

(c) The white area length periodicity judging section 24c or the black area length periodicity judging section 24b judges that there is periodicity.

If the criterion in. judging the number of white-black-gray sets is satisfied for neither ahead of nor behind the target pixel, it is judged that the target pixel is not a dotted area pixel.

If the criterion in judging periodicity in the length of the white-black-gray set is satisfied for neither ahead of nor behind the target pixel, it is judged that the target pixel is not a dotted area pixel.

If it is judged that there is no periodicity in the judgment of periodicity in the length of the white area and there is no periodicity in the judgment of periodicity in the length of the black area ahead of and behind the target pixel, it is judged that the target pixel is not a dotted area pixel.

Although description was made of processing with respect to one target pixel, the dot judging section 24 repeatedly performs the same processing with respect to respective pixels by shifting the target pixel by one pixel at a time. Consequently, it is finally judged whether or not all pixels corresponding to one line are dotted area pixels.

When the target pixel is gray, no judgment is made by the dot judging section 24. At this time, the target pixel is regarded as a pixel other than a dotted area pixel.

Figure 13:
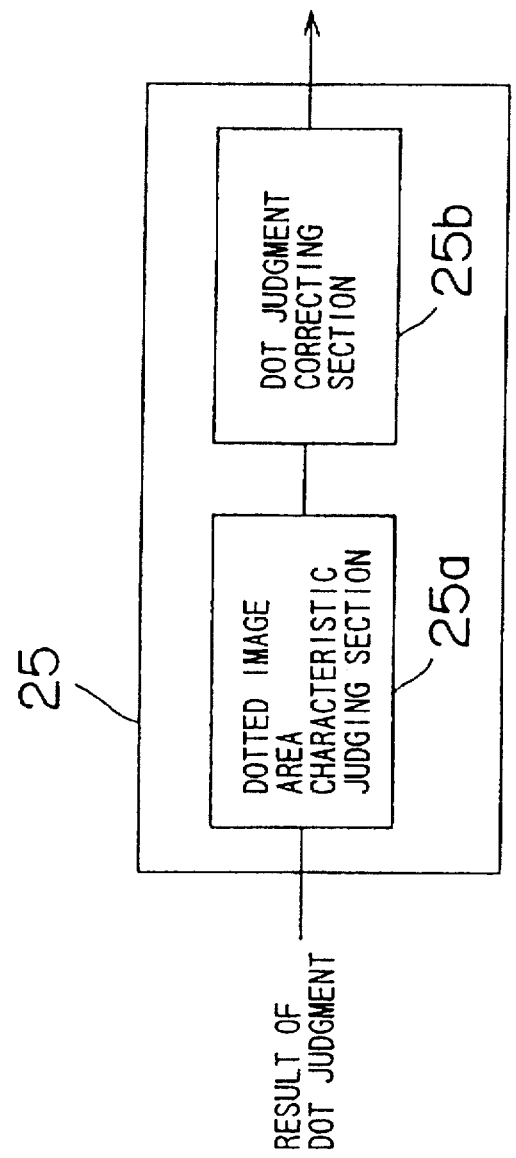
FIG. 13 is a block diagram for explaining the flow of processing in a dotted image judgment correcting section.

1-4. Dot judgment correcting section 25 (FIG. 13)

1-4-1. Dotted image area characteristic judging section 25a

A dotted image area characteristic judging section 25a performs processing for judging, in a case where a dotted area pixel is found by the dot judging section 24, the area characteristics of the dotted area pixel.

It is judged whether or not the target pixel and the succeeding pixel ahead of the target pixel are dotted area pixels, and the judgment is then continuously made a total of A times (A is 24, for example).

If 60% of A dotted area pixels (0.6A) exist ahead of the target pixel, it is judged that there are dotted image area characteristics ahead of the target pixel. If they do not exist, it is judged that there are no dotted image area characteristics. That is, if the density of the dotted area pixel in the vicinity of the target pixel is low, it is judged that there are no dotted image area characteristics.

Furthermore, it is judged whether or not the target pixel and the succeeding pixel behind the target pixel are dotted area pixels, and the judgment is then continuously made a total of A times. If 60% of A dotted area pixels (0.6A) exist behind the target pixel, it is judged that there are dotted image area characteristics behind the target pixel. If they do not exist, it is judged that there are no dotted image area characteristics.

1-4-2. Dot judgment correcting section 25b

A dot judgment correcting section 25b utilizes the result of the judgment of the area characteristics by the dotted image area characteristic judging section 25a to determine the target pixel as a dotted area pixel if there are dotted image area characteristics ahead of or behind the target pixel. If there are not dotted image area characteristics, the result of the judgment by the dot judging section 24 is nullified, to judge that the target pixel is not a dotted area pixel.

1-5. Dotted image area expanding section 26

A dotted image area expanding section 26 performs processing for determining a dotted image area using the result of judgment "the target pixel is/is not a dotted area pixel" given from the dot judgment correcting section 25.

It is judged successively with respect to pixels constituting one line whether or not the target pixel is a dotted area pixel, after which the judgment is also made with respect to pixels constituting the adjacent line.

As a result, the distribution of a row of dotted area pixels may, in some cases, be not longitudinally continuous but in a stripe shape. Since the dotted image area is generally continuous over an area having predetermined dimensions, however, it is appropriate that a pixel around the dotted area pixels is also taken as a dotted area pixel.

FIG. 14 illustrates such an area expanding method. In a matrix with three pixels by three pixels centered with respect to the target pixel, if the target pixel is a dotted area pixel, all eight pixels around the target pixel are taken as dotted area pixels. Consequently, an area which is constituted by dotted area pixels is expanded one pixel at a time in the longitudinal and transverse directions.

2. Second Embodiment

Description is now made of a second embodiment of the present invention. In the description of the present embodiment, the respective drawings used for describing the above described first embodiment are suitably used.

Figure 15:
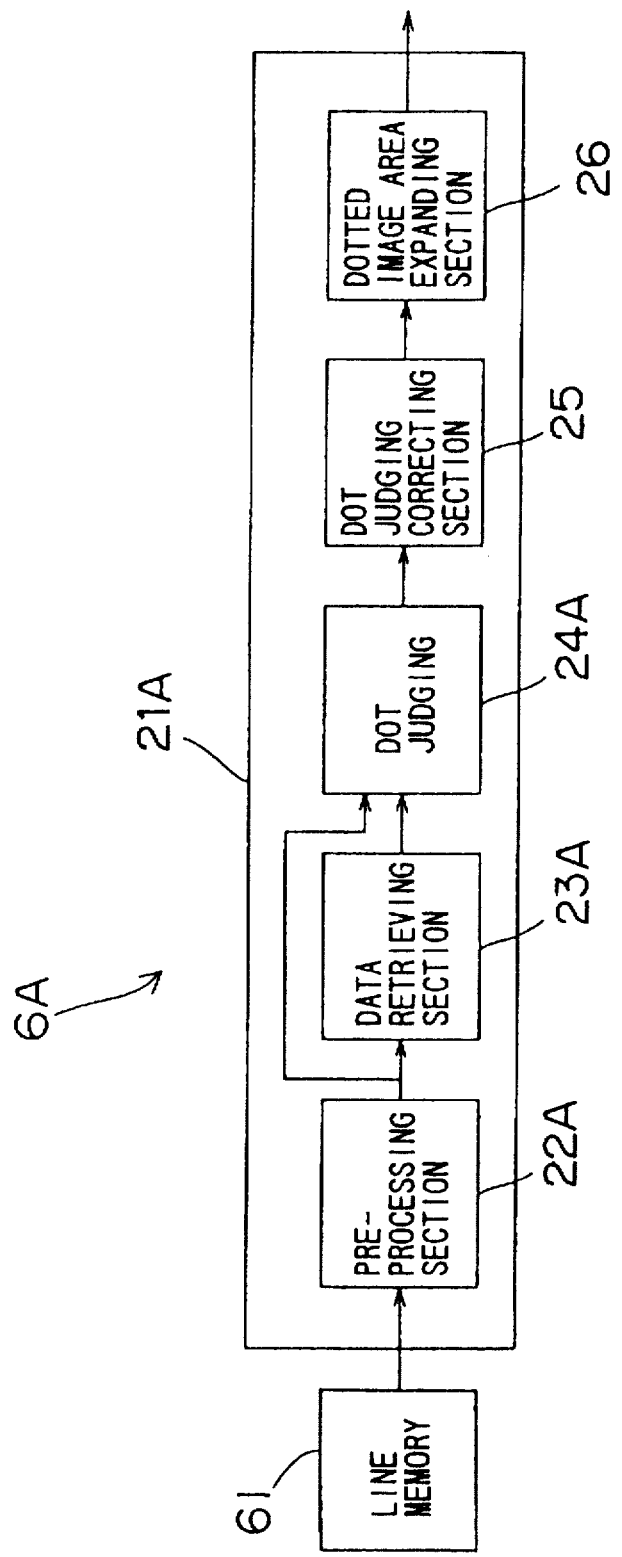
FIG. 15 is a block diagram showing the flow of processing in a character/picture/dotted area judging section according to a second embodiment of the present invention.

FIG. 15 is a block diagram showing the internal construction of a character/picture/dotted area judging section 6A to be used in place of the character/picture/dotted area judging section 6 in the above described color digital copying machine. In FIG. 15, sections having the same functions as those of the respective sections shown in FIG. 2 are assigned the same reference numerals.

Although image data is ternary-coded in the above described embodiment, image data is binary-coded into a white pixel or a black pixel in the present embodiment. Dotted image judging processing is performed on the basis of the binary image data. Because of such difference, the construction of the character/picture/dotted area judging section 6A slightly differs from the construction of the character/picture/dotted area judging section 6 in the first embodiment. More specifically, a dotted image area judging section 21A provided in the character/picture/dotted area judging section 6A differs in the function from the above described dotted image area judging section 21.

The foregoing will be described in more detail. The dotted image area judging section 21A is constituted by a preprocessing section 22A, a data retrieving section 23A, a dot judging section 24A, a dot judgment correcting section 25, and a dotted image area expanding section 26. The functions of the preprocessing section 22A, the data retrieving section 23A and the dot judging section 24A out of the sections differ from the functions of the corresponding sections in the first embodiment.

Figure 16:
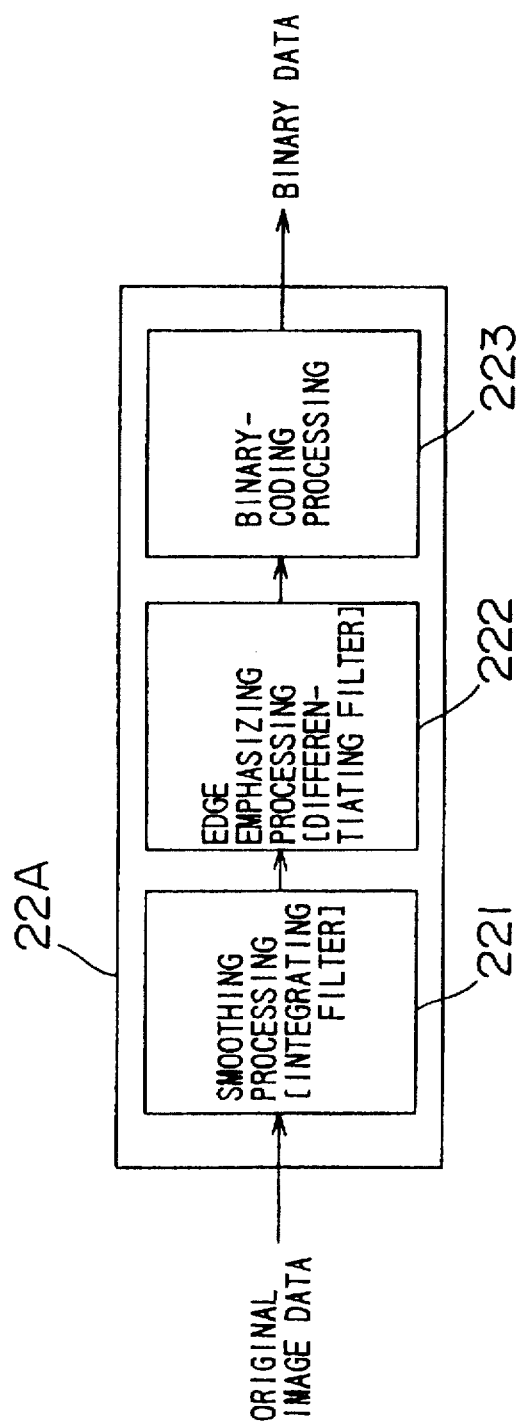
FIG. 16 is a block diagram showing the flow of processing in a preprocessing section.

The preprocessing section 22 subjects image data corresponding to one line outputted from a line memory 61 to smoothing processing 221, edge emphasizing processing 222 and binary-coding processing 223, as shown in FIG. 16.

Figure 17:
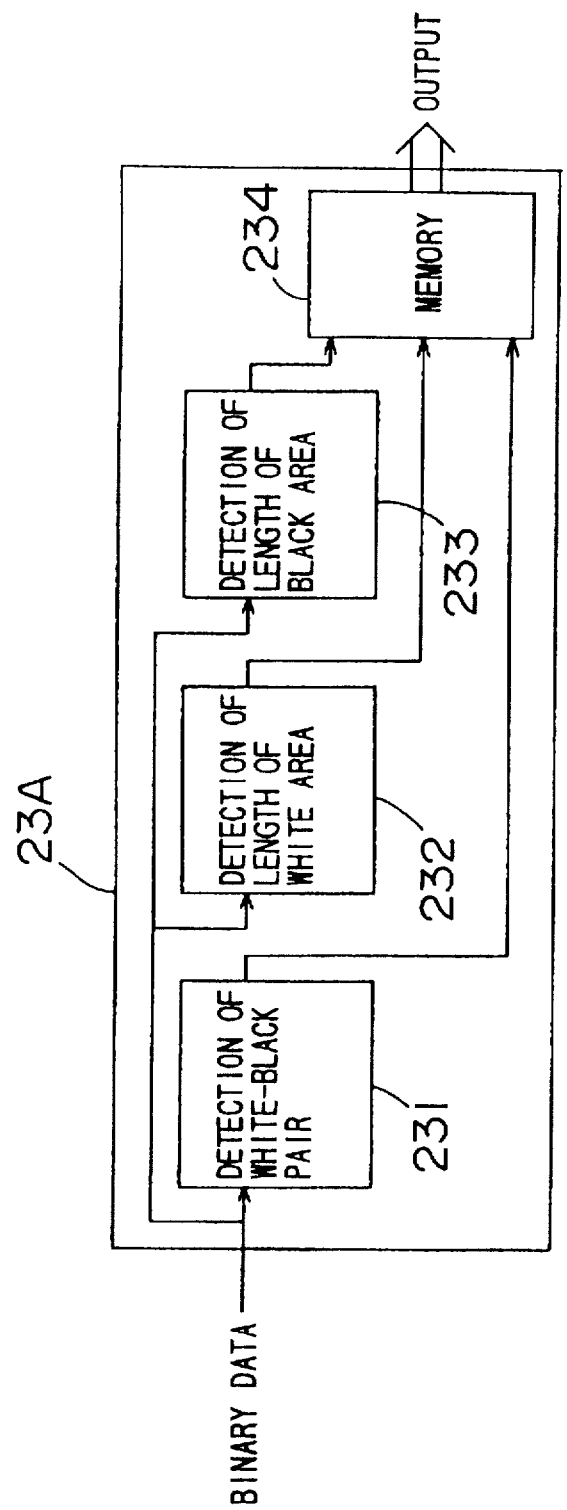
FIG. 17 is a block diagram showing the flow of processing in a data retrieving section.

The data retrieving section 23A detects the length of a white-black pair (231), detects the length of a white area, and detects the length of a black area (233) on the basis of data representing the target pixel and pixels ahead of and behind the target pixel which have passed through the preprocessing section 22A, as shown in FIG. 17.

The results of the detection are inputted to the dot judging section 24A, where synthetic judgment whether or not the target pixel is a dotted area pixel is made.

The result of the synthetic judgment is corrected in the dot judgment correcting section 25, and is subjected to area expansion in the dotted image area expanding section 26.

Description is now made of the details of the functions of the respective sections.

2-1. Preprocessing section 22A

Referring to FIG. 16, the preprocessing section 22A subjects image data corresponding to one line to smoothing processing (221), edge emphasizing processing (222), and binary-coding processing (223).

The smoothing processing is for removing noise, and is performed using a smoothing filter of one line by three dots, as shown in FIG. 5. Specifically, a value obtained by increasing the density of each of pixels adjacent to the target pixel on both sides by one time is added to a value obtained by increasing the density of the target pixel by X times, and the result of the addition is divided by (X+2), whereby the new density of the target pixel is calculated. Although the value of X is set to three, for example, it may be set to four or five.

Figure 18:
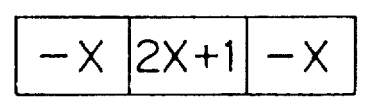

The edge emphasizing processing is for preventing a blur of dots, and is performed using a sharpening filter of one line by three dots, as shown in FIG. 18. Specifically, a value obtained by increasing the density of each of pixels adjacent to the target pixel on both sides by −X times is added to a value obtained by increasing the density of the target pixel by (2X+1), times, whereby the new density of the target pixel is calculated. Although the value of X is set to eight, for example, it may be set to six or seven.

The binary-coding processing section 223 binary-codes the target pixel into a white pixel or a black pixel. Therefore, a threshold value is set. The binary-coding processing section 223 outputs a signal of "1" if the density of the target pixel is not less than the threshold value, while outputting a signal of "0" if it is less than the threshold value. A pixel corresponding to the signal of "1" and a pixel corresponding to the signal of "0" are respectively referred to as a "black pixel" and a "white pixel". If the density of the pixel is represented at 256 gray levels, the threshold value may be set to 100, for example.

2-2. Data retrieving section 23A

Referring to FIG. 17, the data retrieving section 23A detects the length of a white-black pair, detects the length of a white area, and detects the length of a black area on the basis of data representing the target pixel and pixels around the target pixel which have passed through the preprocessing section 22A.

2-2-1. Detection of white-black pair (231)

A white-black pair detecting section 231 detects a white-black pair on the basis of binary data after binary-coding processing.

Figure 19:
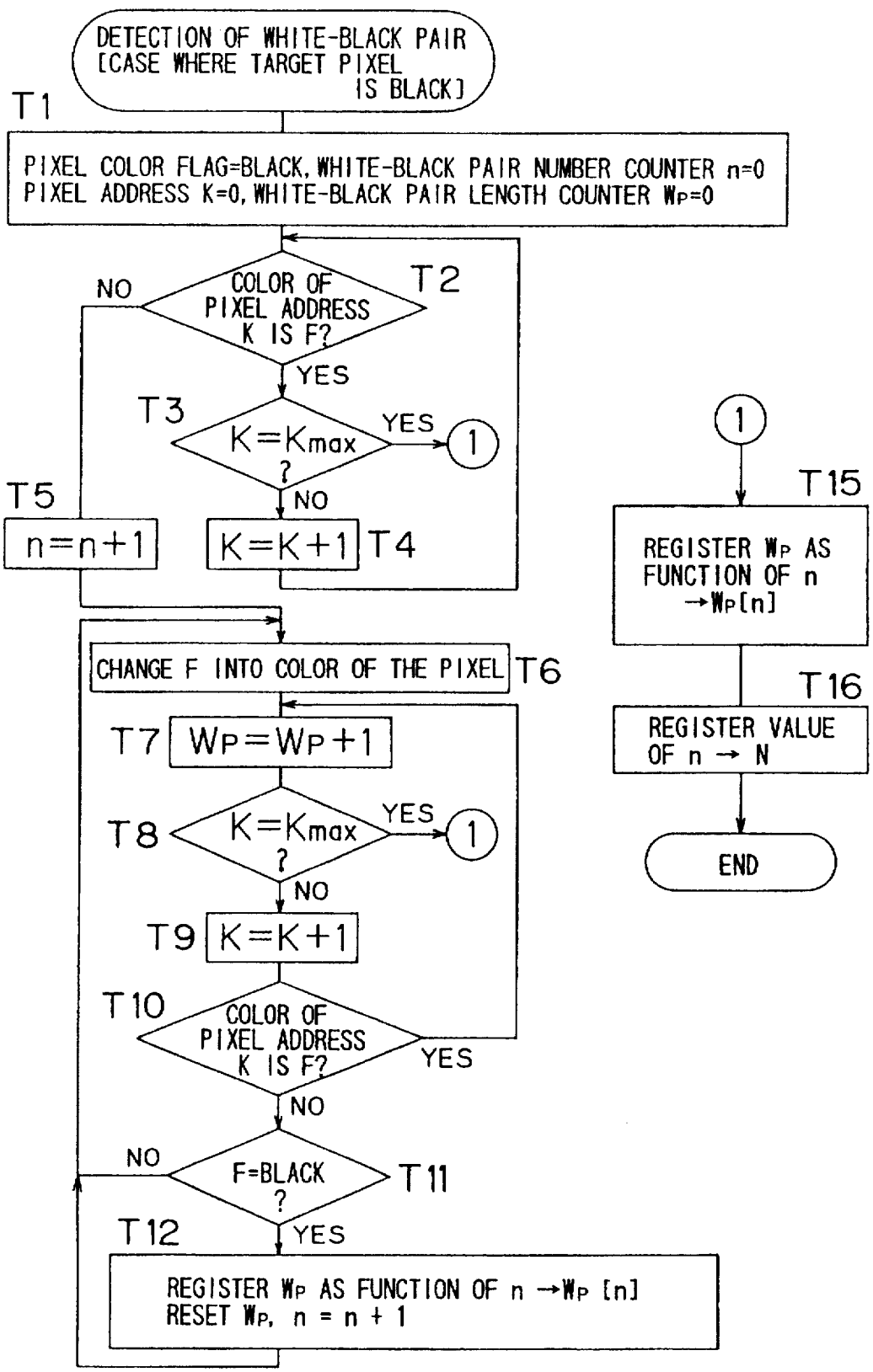
FIG. 19 is a flow chart for explaining the flow of the detection of the length of a white-black pair.
Figure 20:
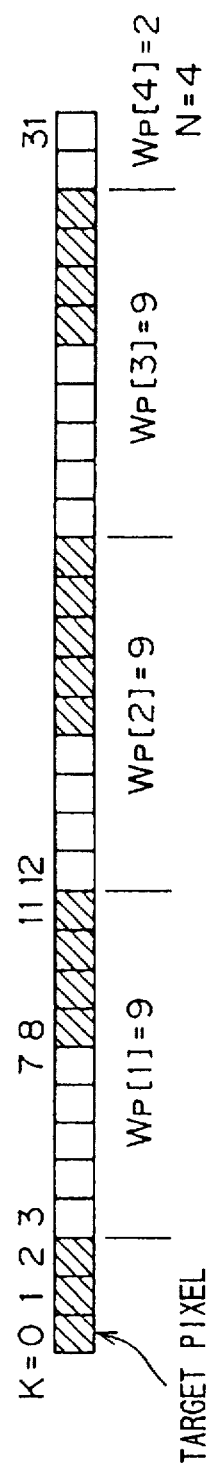
FIG. 20 is a diagram showing a row of pixels to be detected for detecting the length of a white-black pair in a case where a target pixel is a black pixel.
Figure 21:
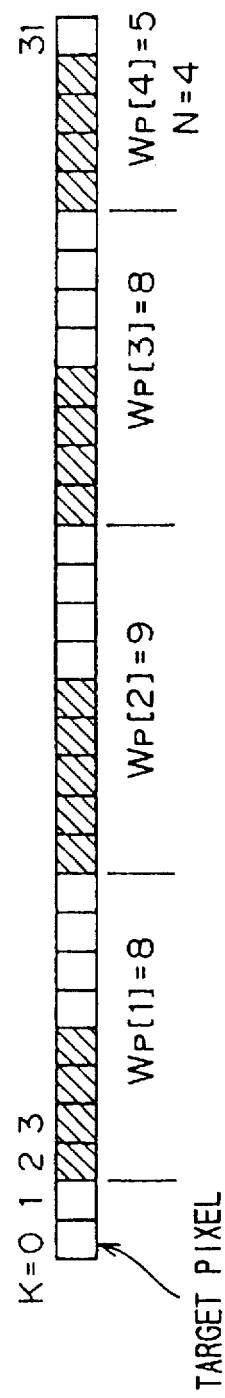
FIG. 21 is a diagram showing a row of pixels to be detected for detecting the length of a white-black pair in a case where a target pixel is a white pixel.

FIG. 19 is a flow chart showing detection of a white-black pair, and FIGS. 20 and 21 illustrate a row of pixels to be detected. The row of pixels to be detected is constituted by 32 continuous pixels assigned addresses 0 to 31, starting with the target pixel (the leftmost pixel). FIG. 20 illustrates a case where the target pixel is a black pixel, and FIG. 21 illustrates a case where the target pixel is a white pixel. In FIGS. 20 and 21, the black pixel is indicated by oblique hatching.

Referring to FIGS. 19 and 20, description is now made of a case where the target pixel is a black pixel. First, a pixel color flag F is set to a black color which is the color of the target pixel, a white-black pair number counter n is initialized to zero, a pixel address K is set to zero, and a white-black pair length counter $W_P$ is initialized to zero (step T1).

It is judged whether or not the color of a pixel assigned the address K conforms to the color represented by the pixel color flag F (step T2). It is first judged whether or not the color of a pixel assigned an address 0 is black.

If the answer is in the affirmative, it is judged whether or not the address K takes the final value Kmax (step T3). The final value Kmax corresponds to the number of pixels in a one-dimensional area ahead of the target pixel, where Kmax=31, for example.

If K<Kmax, one is added to the address K (step T4), after which the program is returned to the step T2.

If the color of the pixel does not conform to the color represented by the pixel color flag F in the step T2, that is, if a pixel in a different color is encountered, the white-black pair number counter n is incremented by one (step T5), the color represented by the pixel color flag F is changed into the color of the pixel (step T6), and the white-black pair length counter $W_P$ is incremented by one (step T7).

In an example shown in FIG. 20, at the time when a pixel assigned an address 3 is processed, the white-black pair number counter n is set to one, the color represented by the pixel color flag F is changed into a white color, and the white-black pair length counter $W_P$ is set to one.

Thereafter, it is judged whether or not the address K takes the final value Kmax (step T8), one is added to the address K unless the address K takes the final value Kmax (step T9), and it is judged whether or not the color of the pixel assigned the address K conforms to the color represented by the pixel color flag F (step T10). If the answer is in the affirmative, the white-black pair length counter $W_P$ is incremented by one (step T7), after which the same processing is repeated. So long as white pixels are continuous, the white-black pair length counter $W_P$ is thus incremented by one at a time.

If it is judged in the step T10 that the color of the pixel assigned the address K does not conform to the color represented by the pixel color flag F (the color is changed), it is examined in the step T11 whether the color represented by the pixel color flag F is white or black. At the time point of the judgment, F represents the color of the preceding pixel. Accordingly, judgment in the affirmative represents the change from a black color to a white color, and judgment in the negative represents the change from a white color to a black color.

If it is judged in the step T11 that the answer is in the negative, the program is returned to the step T6. In the step T6, the color represented by the pixel color flag F is changed into a black color, after which the length in which black pixels are continuous is detected.

In the example shown in FIG. 20, after a black pixel assigned an address 8 is processed, the length in which black pixels are continuous is detected.

When the color of the pixel is changed once again, it is judged in the step T11 that the answer is in the negative at this time. Consequently, one white-black pair is completed at this time point.

In the example shown in FIG. 20, it is considered that one white-black pair is completed at the time of processing a white pixel assigned an address 12. The value of the white-black pair length counters $W_P$ at this time represents the length of the white-black pair, and the value of the white-black pair number counter n represents the number of white-black pairs so far produced. In this case, the length of the white-black pair corresponds to the distance between change points at which the value of the pixel is changed from "black" to "white". In addition, the number of white-black pairs corresponds to the number of pairs of change points.

In the step T12, the value of the white-black pair length counter $W_P$ is registered in a memory 234 as a function $W_P[n]$ of the white-black pair number counter n, the white-black pair length counter $W_P$ is reset to zero, and the white-black pair number counter n is incremented by one, after which the program is returned to the step T6. In the step T6 and the subsequent steps, the same processing is performed.

When the address K finally takes the final value Kmax, counting by the white-black pair length counter $W_P$ and counting by the white-black pair number counter n are terminated, and the value of the white-black pair length counter $W_P[n]$ at the time point of the termination is registered in the memory 234 (see FIG. 17) (step T15). In addition, the value of the white-black pair number counter n is registered in the memory 234 as the number of white-black pairs N (step T16). The termination and the registration are performed in the same manner, whether the color of the final pixel is white or black.

In the example shown in FIG. 20, the counting is terminated at the time of processing a white pixel assigned an address 31, whereby the value "2" of the white-black pair length counter $W_P[4]$ and the value "4" of the white-black pair number counter n at that time are registered in the memory 234.

In the foregoing manner, the number of white-black pairs N included in the row of pixels and the lengths $W_P[n]$ thereof can be registered.

The above described processing is also performed on the left side of the target pixel. In this case, the final value Kmax is replaced with −Kmax, and the processing in the steps T4 and T9, i.e., "K=K+1" is replaced with "K=K−1". In the following, a subscript "−" shall be assigned with respect to the result of processing of a row of pixels on the left side of (behind) the target pixel, and a subscript "+" shall be assigned with respect to the result of processing of a row of pixels on the right side of (ahead of) the target pixel.

The foregoing processing is processing in a case where the first target pixel is a black pixel. Even when the first target pixel is a white pixel, however, the length of a white-black pair can be detected in approximately the same manner. In this case, "pixel color flag F=black" in the step T1 and "F=black" in the step T11 in FIG. 19 may be respectively changed into "pixel color flag F=white" and "F=white", and a row of pixels to be detected is as shown in FIG. 21. In this case, the length of the white-black pair corresponds to the distance between change points at which the value of the pixel is changed from "white" to "black".

2-2-2. Detection of length of white area

Processing by a white area length detecting section 232 is the same as the processing by the white area length detecting section 23b in the above described first embodiment, and is indicated by the flow chart of FIG. 9 already described. Consequently, description of processing by the white area length detecting section 232 is not repeated in order to avoid overlapping of the description.

2-2-3. Detection of length of black area

Processing by a black area length detecting section 233 is the same as the processing by the black area length detecting section 23c in the above described first embodiment. Specifically, the length of a black area can be detected in entirely the same manner as the length of a white area by only replacing a subscript W representing a white color with a subscript B representing a black color and respectively replacing "white" and "black" with "black" and "white" in the flow chart of FIG. 9.

2-3. Dot judging section 24A

The dot judging section 24A is constructed as shown in FIG. 22 and judges whether or not the target pixel is included in a dotted image area on the basis of respective data representing the numbers of white-black pairs $N_+$ and $N_-$, the lengths of the white-black pair $W_{P+}[n]$ (n=1, 2, ...) and $W_{P-}[n]$, the numbers of white areas $M_{W+}$ and $M_{W-}$, the lengths of the white area $W_{W+}[m]$ (m=1, 2, ...) and $W_{W-}[m]$, the numbers of black areas $M_{B+}$ and $M_{B-}$, and the lengths of the black area $W_{B+}[m]$ and $W_{B-}[m]$ with respect to a row of 2Kmax pixels ahead of and behind the target pixel (a row of pixels assigned addresses −Kmax to +Kmax) and binary image data which are sent from the data retrieving section 23A.

2-3-1. White-black pair number judging section 241

A white-black pair number judging section 241 judges whether or not the target pixel is a dot candidate on the basis of the number of white-black pairs N. In a case where the number of white-black pairs with respect to a row of pixels to be detected ahead of the target pixel is taken as $N_+$, the target pixel is taken as a dot candidate if the following expression (15) holds, while the target pixel is not taken as a dot candidate if it does not hold:

Lower limit threshold value of $N \leq N_+$ or $N_+ \leq$ Upper limit threshold value of N   (15)

The lower limit threshold value of N is set to 3 and the upper limit threshold value of N is set to 16 with respect to a row of 32 pixels, for example.

The ground of the numerals is the same as that in the case of the expression (1) described in the first embodiment.

The number of white-black pairs is judged similarly with respect to a row of pixels to be detected behind the target pixel.

2-3-2. White-black pair length periodicity judging section 242

A white-black pair length periodicity judging section 242 judges whether or not there is periodicity in the length of a white-black pair. In a dotted image area, the white-black pair is generally repeated in approximately the same period.

When the target pixel is taken as a dot candidate by the white-black pair number judging section 241 described in the above item 2-3-1, the length of the white-black pair $W_{P+}[n]$ with respect to the row of pixels to be detected ahead of the target pixel is read out from the memory 234.

For example, the upper limit threshold value of the length of the white-black pair $W_P$ is set to 12, and the lower limit threshold value thereof is set to 2. The ground of the numerals is the same as that in the case of the threshold value employed in the processing by the white-black-gray set length periodicity judging section 24b in the above described first embodiment.

It is first judged whether or not the conditions indicated by the following expression (16) are satisfied with respect to the length of the first white-black pair $W_{P+}[1]$:

Lower limit threshold value of $W_P \leq W_{P+}[1]$ or $W_{P+}[1] \leq$ Upper limit threshold value $W_P$   (16)

If the expression is not satisfied, it is considered that the target pixel is not a dot candidate. The reason for this is that unless the length of the first white-black pair enters a range between the upper limit threshold value and the lower limit threshold value, it is apart from the ruling generally used.

If the foregoing expression (16) is satisfied, periodicity in the length of the white-black pair is judged.

Therefore, the upper limit threshold value, for judging periodicity is set to $W_{P+}[1]+1$ on the basis of the length of the first white-black pair $W_{P+}[1]$.

It is judged whether or not the conditions indicated by the following expression (17) are satisfied with respect to the lengths of the second to $(N_+1)$-th black-white pairs $W_{P+}[n]$:

Lower limit threshold value for judging periodicity $\leq W_{P+}[n] \leq$ Upper limit threshold value for judging periodicity   (17)

It is judged whether or not the relationship with the upper limit threshold value represented by the following expression (18) is satisfied with respect to the length of the final $N_+$-th white-black pair $W_{P+}[N+]$:

$W_{P+}[N_+] \leq$ Upper limit threshold value for judging periodicity   (18)

The reason why only the relationship with the upper limit threshold value is judged is that the counting of the length of the final $N_+$-th white-black pair $W_{P+}[N_+]$ is terminated on the way.

If the foregoing expressions (17) or (18) are not satisfied with respect to all the lengths of the second to final $N_+$-th white-black pairs $W_{P+}$, it is considered that there is no periodicity.

Furthermore, the same judgment of periodicity in the length of the white-black pair is also made with respect to a row of pixels to be detected behind the target pixel.

2-3-3. Black area length periodicity judging section 243 and white area length periodicity judging section 244.

Processing by a black area length periodicity judging section 243 is the same as the processing by the black area length periodicity judging section 24c in the first embodiment, and processing by a white area length periodicity judging section 244 is the same as the processing by the white area length periodicity judging section 24d in the first embodiment. The description of the sections will not be repeated in order to avoid overlapping of description.

2-3-4. Dot synthetic judging section 245

A dot synthetic judging section 245 judges whether or not the target pixel is a pixel included in a dotted image area (dotted area pixel) on the basis of the results of the judgments by the white-black pair number judging section 241, the white-black pair length periodicity judging section 242, the white area length periodicity judging section 243, and the black area length periodicity judging section 244.

More specifically, in judgment based on a row of pixels to be detected either ahead of or behind the target pixel, if three conditions indicated by the following items (a), (b) and (c) are satisfied, it is judged that the target pixel is a dotted area pixel.

(a) The white-black pair number judging section 241 judges that the target pixel is a dot candidate.

(b) The white-black pair length periodicity judging section 242 judges that the target pixel is a dot candidate.

(c) The white area length periodicity judging section 243 or the black area length periodicity judging section 244 judges that there is periodicity.

If the criterion in judging the number of white-black pairs is satisfied for neither ahead of nor behind the target pixel, it is judged that the target pixel is not a dotted area pixel.

If the criterion in judging periodicity in the length of the white-black pair is satisfied for neither ahead of nor behind the target pixel, it is judged that the target pixel is not a dotted area pixel.

If it is judged that there is no periodicity in the judgment of periodicity in the length of the white area and there is no periodicity in the judgment of periodicity in the length of the black area ahead of and behind the target pixel, it is judged that the target pixel is not a dotted area pixel.

Although description was made of processing with respect to one target pixel, the dot judging section 24A repeatedly performs the same processing with respect to the respective pixels by shifting the target pixel by one pixel at a time. Consequently, it is finally judged whether or not all pixels corresponding to one line are dotted area pixels.

2-4. Dot judgment correcting section 25 and dotted image area expanding section 26

If it is judged by the dot judging section 24A that the target pixel is a dotted area pixel, processing by the dot judgment correcting section 25 and the dotted image area expanding section 26 is performed in the same manner as that in the first embodiment. That is, the dot judgment correcting section 25 judges again whether or not the target pixel is a dotted area pixel on the basis of continuity of dotted area pixels. On the other hand, the dotted image area expanding section 26 forces pixels around the dotted area pixels to be dotted area pixels.

3. Other Embodiments

The present invention is not limited to the above described embodiments. For example, image data is ternary-coded in the first embodiment, while image data is binary-coded in the second embodiment. However, the embodiments are only examples of processing for coding image data into one of a predetermined number of discrete values. For example, the image data may be coded into one of four or more discrete values.

Although in the above described embodiments, description has been made of a color digital copying machine by way of example, the present invention is applicable to another arbitrary apparatus required to detect a dotted area pixel in an image, for example, a monochrome digital copying machine, a color/monochrome facsimile, or a color/monochrome printer.

Although the present invention has been described and illustrated in detail, it is clearly understood that the description is by way of illustration and example only and is not to be taken by way of limitation, the spirit and scope of the present invention being limited only by the terms of the appended claims.

What is claimed is:

1. A dotted area pixel detecting apparatus for detecting pixels constituting a dotted image area in an image on the basis of image data representing densities of pixels constituting the image, comprising:

preprocessing means for coding the image data corresponding to each of the pixels into one of a predetermined number of discrete values;

distance detecting means for detecting the distance between change points at which a value of a pixel is changed from a first value to a second value on the basis of an output of the preprocessing means;

judging means for judging whether or not a target pixel is a pixel constituting a dotted image area, the judging means including means for judging whether or not there is a possibility that the target pixel constitutes a dotted image area based on whether or not periodicity is recognized in the distance between the change points in the vicinity of the target pixel; and continuous length detecting means for detecting continuous length of each series of same-value pixels on the basis of the output of the preprocessing means, wherein, the judging means further includes means, to which an output of the continuous length detecting means is applied, for judging whether or not there is a possibility that the target pixel constitutes a dotted image area based on whether or not periodicity is recognized in the continuous length of the series of same-value pixels.

2. An apparatus according to claim 1, wherein the image is constituted by a plurality of lines each including a plurality of pixels, the apparatus further comprises storing means for storing image data corresponding to at least one line, the preprocessing means codes the image data corresponding to each of the pixels stored in the storing means.

3. An apparatus according to claim 1, wherein the image is constituted by a plurality of lines each including a plurality of pixels, the apparatus further comprises means for counting a number of pairs of change points at which a value of a pixel is changed from a first value to a second value in a row of pixels to be detected including a predetermined number of pixels on a line to which the target pixel belongs, the judging means further includes means for judging whether or not there is a possibility that the target pixel constitutes a dotted image area based on whether or not the counted number of pairs of change points is in a predetermined range.

4. An apparatus according to claim 1, further comprising density detecting means for detecting a density of pixels constituting a dotted image area in the vicinity of the target pixel which is judged to be a pixel constituting a dotted image area by the judging means; and dot judgment correcting means for determining that the target pixel is a pixel constituting a dotted image area if the density of pixels constituting a dotted image area detected by the density detecting means is not less than a predetermined value, while nullifying the judgment by the judging means if the density is less than the predetermined value.

5. An apparatus according to claim 1, further comprising dotted image area expanding means for regarding as a pixel constituting a dotted image area a pixel around a pixel which is judged to be a pixel constituting a dotted image area.

6. An apparatus according to claim 1, wherein the preprocessing means includes means for smoothing the image data, and means for treaty-coding the smoothed image data.

7. An apparatus according to claim 1, wherein
the preprocessing means includes
means for smoothing the image data,
means for subjecting the smoothed image data to edge emphasizing processing, and
means for binary-coding the image data which has been subjected to the edge emphasis.

8. A method for detecting a pixel constituting a dotted image area in an image on the basis of image data representing densities of pixels constituting the image, comprising:
   a preprocessing step for coding the image data corresponding to each of the pixels into one of a predetermined number of discrete values;
   a step of detecting a distance between change points at which a value of a pixel after the coding is changed from a first value to a second value;
   a step of judging whether or not there is a possibility that a target pixel constitutes a dotted image area based on whether or not periodicity is recognized in the distance between the change points in the vicinity of the target pixel;
   a step of detecting a continuous length of each series of same-value pixels on the basis of the image data after the coding; and
   a step of judging whether or not there is a possibility that the target pixel constitutes a dotted image area based on whether or not periodicity is recognized in the continuous length of the series of same-value pixels.

9. A method according to claim 8, wherein the image is constituted by a plurality of lines each including a plurality of pixels, and
   the method further comprises the steps of;
   counting a number of pairs of change points at which a value of a pixel is changed from a first value to a second value in a row of pixels to be detected including a predetermined number of pixels on a line to which the target pixel belongs, and
   judging whether or not there is a possibility that the target pixel constitutes a dotted image area based on whether or not the counted number of pairs of change points is in a predetermined range.

10. A method according to claim 8, further comprising the steps of
    detecting the density of pixels constituting a dotted image area in the vicinity of the target pixel which is judged to be a pixel constituting a dotted image area, and
    nullifying the judgment by the judging means if the detected density of pixels constituting a dotted image area is less than a predetermined value.

11. A method according to claim 8, further comprising the step of
    regarding as a pixel constituting a dotted image area a pixel around a pixel which is judged to be a pixel constituting a dotted image area.

* * * * *